United States Patent
Sasaki et al.

(10) Patent No.: US 11,045,976 B2
(45) Date of Patent: Jun. 29, 2021

(54) APPARATUS FOR PRODUCING THREE-DIMENSIONAL OBJECTS, METHOD FOR PRODUCING THREE-DIMENSIONAL OBJECTS, AND NON-TRANSITORY RECORDING MEDIUM

(71) Applicant: RICOH COMPANY, LTD., Tokyo (JP)

(72) Inventors: Takafumi Sasaki, Kanagawa (JP); Shinichiroh Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 585 days.

(21) Appl. No.: 15/440,023

(22) Filed: Feb. 23, 2017

(65) Prior Publication Data
US 2017/0259456 A1    Sep. 14, 2017

(30) Foreign Application Priority Data

Mar. 9, 2016 (JP) .............................. JP2016-046122
Jan. 6, 2017 (JP) .............................. JP2017-001415

(51) Int. Cl.
*B28B 17/00* (2006.01)
*B29C 64/165* (2017.01)
(Continued)

(52) U.S. Cl.
CPC .......... *B28B 17/0081* (2013.01); *B22F 10/10* (2021.01); *B28B 1/001* (2013.01);
(Continued)

(58) Field of Classification Search
CPC ..... B29C 64/165; B29C 64/393; B33Y 10/00; B33Y 30/00; B33Y 50/02; B22F 3/008
See application file for complete search history.

(56) References Cited

U.S. PATENT DOCUMENTS 8,784,723 B2 *   7/2014   Napadensky ........... B29C 64/00
                                                                264/497
2004/0159978 A1   8/2004   Nielsen et al.
(Continued)

FOREIGN PATENT DOCUMENTS

EP       1442870 A1      8/2004
JP    2005-120475 A      5/2005
(Continued)

OTHER PUBLICATIONS

U.S. Appl. No. 15/276,881, filed Sep. 27, 2016.
(Continued)

*Primary Examiner* — Galen H Hauth
(74) *Attorney, Agent, or Firm* — Oblon, McClelland, Maier & Neustadt, L.L.P.

(57) ABSTRACT

An apparatus for producing three-dimensional objects is provided including a bonding liquid applier and a controller. The bonding liquid applier applies a bonding liquid to a powder layer to form a bonded layer. The controller controls the bonding liquid applier to repeatedly form an (n)th bonded layer by applying a predetermined amount of the bonding liquid per unit area, in multiple times, to a new bonding region in an (n)th powder layer, below which an (n−1)th bonded layer does not exist, and applying the predetermined amount of the bonding liquid per unit area, in a smaller number of times than the multiple times, to an existing bonding region in the (n)th powder layer, below which the (n−1)th bonded layer exists, while increasing a numeral (n) representing an integer of 1 and above in increment of 1, to laminate multiple bonded layers into a three-dimensional object.

13 Claims, 22 Drawing Sheets

(51) Int. Cl.
*B22F 10/10* (2021.01)
*B33Y 10/00* (2015.01)
*B33Y 30/00* (2015.01)
*B33Y 50/02* (2015.01)
*B28B 1/00* (2006.01)
*B29C 64/393* (2017.01)

(52) U.S. Cl.
CPC ............ *B29C 64/165* (2017.08); *B33Y 10/00* (2014.12); *B33Y 30/00* (2014.12); *B33Y 50/02* (2014.12); *B29C 64/393* (2017.08)

(56) References Cited

U.S. PATENT DOCUMENTS

| | | |
|---|---|---|
| 2005/0079086 A1 | 4/2005 | Farr et al. |
| 2007/0029693 A1 | 2/2007 | Wigand et al. |
| 2009/0252821 A1 | 10/2009 | Wigand et al. |
| 2011/0285052 A1 | 11/2011 | Wigand et al. |
| 2015/0343533 A1 | 12/2015 | Park et al. |
| 2016/0067929 A1 | 3/2016 | Park |
| 2016/0075085 A1 | 3/2016 | Sasaki |
| 2016/0214320 A1 | 7/2016 | Sasaki et al. |
| 2016/0243765 A1 | 8/2016 | Sasaki et al. |
| 2016/0243805 A1 | 8/2016 | Satoh |
| 2016/0332373 A1 | 11/2016 | Kuhn et al. |
| 2016/0332380 A1 | 11/2016 | De Pena et al. |
| 2016/0361874 A1 | 12/2016 | Park et al. |
| 2016/0368214 A1 | 12/2016 | Sasaki et al. |

FOREIGN PATENT DOCUMENTS

| | | |
|---|---|---|
| JP | 2012-030389 | 2/2012 |
| JP | 2012-183689 | 9/2012 |
| JP | 2013-075392 | 4/2013 |
| JP | 2014-088046 | 5/2014 |
| JP | 2015-131399 A | 7/2015 |
| JP | 2015-227021 | 12/2015 |
| JP | 2016-500594 A | 1/2016 |
| JP | 2016-28878 A | 3/2016 |
| WO | 2015/100086 A1 | 7/2015 |
| WO | 2015/108550 A1 | 7/2015 |

OTHER PUBLICATIONS

U.S. Appl. No. 15/299,788, filed Oct. 21, 2016.
European search report dated Aug. 21, 2017 in connection with corresponding European patent application No. 17156104.6.
Japanese Office Action dated Aug. 4, 2020 in Japanese Patent Application No. 2017-001415, 4 pages.

* cited by examiner

NUMBER OF SCANS = 1

A

NUMBER OF SCANS = 4

A

FIG. 10A 1ST SCAN
FIG. 10B 2ND SCAN
FIG. 10C 3RD SCAN
FIG. 10D 4TH SCAN (n−1)TH LAYER (n)TH LAYER (n+1)TH LAYER (n)TH LAYER
(FORWARD MOVEMENT)

(n)TH LAYER
(BACKWARD MOVEMENT)

(n+1)TH LAYER (n)TH LAYER
(FORWARD MOVEMENT)

(n)TH LAYER
(BACKWARD MOVEMENT)

(n+1)TH LAYER
(BACKWARD MOVEMENT)

US 11,045,976 B2

APPARATUS FOR PRODUCING THREE-DIMENSIONAL OBJECTS, METHOD FOR PRODUCING THREE-DIMENSIONAL OBJECTS, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2016-046122 and 2017-001415, filed on Mar. 9, 2016 and Jan. 6, 2017, respectively, in the Japan Patent Office, the entire disclosure of each of which is hereby incorporated by reference herein.

BACKGROUND

Technical Field

The present disclosure relates to an apparatus for producing three-dimensional objects, a method for producing three-dimensional objects, and a non-transitory recording medium.

Description of the Related Art

Additive manufacturing apparatuses are known for producing three-dimensional objects. In a typical additive manufacturing apparatus, metal or non-metal powder particles are formed into a flattened layer (hereinafter "powder layer") on a stage, and a bonding liquid that bonds the powder particles is applied to the powder layer. Thus, a bonded layer is formed in which the powder particles are bonded to each other. Another powder layer is thereafter formed on the bonded layer, and another bonded layer is further formed thereon. This operation is repeatedly performed to laminate multiple bonded layers and obtain a three-dimensional object.

SUMMARY

In accordance with some embodiments of the present invention, an apparatus for producing three-dimensional objects is provided. The apparatus for producing three-dimensional objects includes a bonding liquid applier and a controller. The bonding liquid applier is configured to apply a bonding liquid to a powder layer, so that the bonding liquid bonds powder particles in the powder layer into a bonded layer. The controller controls the bonding liquid applier to repeatedly form an (n)th bonded layer by applying a predetermined amount of the bonding liquid per unit area, in multiple times, to a new bonding region in an (n)th powder layer, below which an (n−1)th bonded layer does not exist, and applying the predetermined amount of the bonding liquid per unit area, in a smaller number of times than the multiple times, to an existing bonding region in the (n)th powder layer, below which the (n−1)th bonded layer exists, while increasing a numeral (n) representing an integer of 1 and above in increment of 1, to laminate multiple bonded layers into a three-dimensional object.

In accordance with some embodiments of the present invention, a method for producing three-dimensional objects is provided. The method includes the step of forming an (n)th bonded layer that includes the step of: applying a predetermined amount of a bonding liquid per unit area, in multiple times, to a new bonding region in an (n)th powder layer, below which an (n−1)th bonded layer does not exist, so that the bonding liquid bonds powder particles in the new bonding region; and applying the predetermined amount of the bonding liquid per unit area, in a smaller number of times than the multiple times, to an existing bonding region in the (n)th powder layer, below which the (n−1)th bonded layer exists, so that the bonding liquid bonds powder particles in the existing bonding region. The step of forming is repeatedly performed while increasing a numeral (n) representing an integer of 1 and above in increment of 1, to laminate multiple bonded layers into a three-dimensional object.

In accordance with some embodiments of the present invention, a non-transitory recording medium storing a plurality of instructions which, when executed by one or more processors, cause the processors to perform the above method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
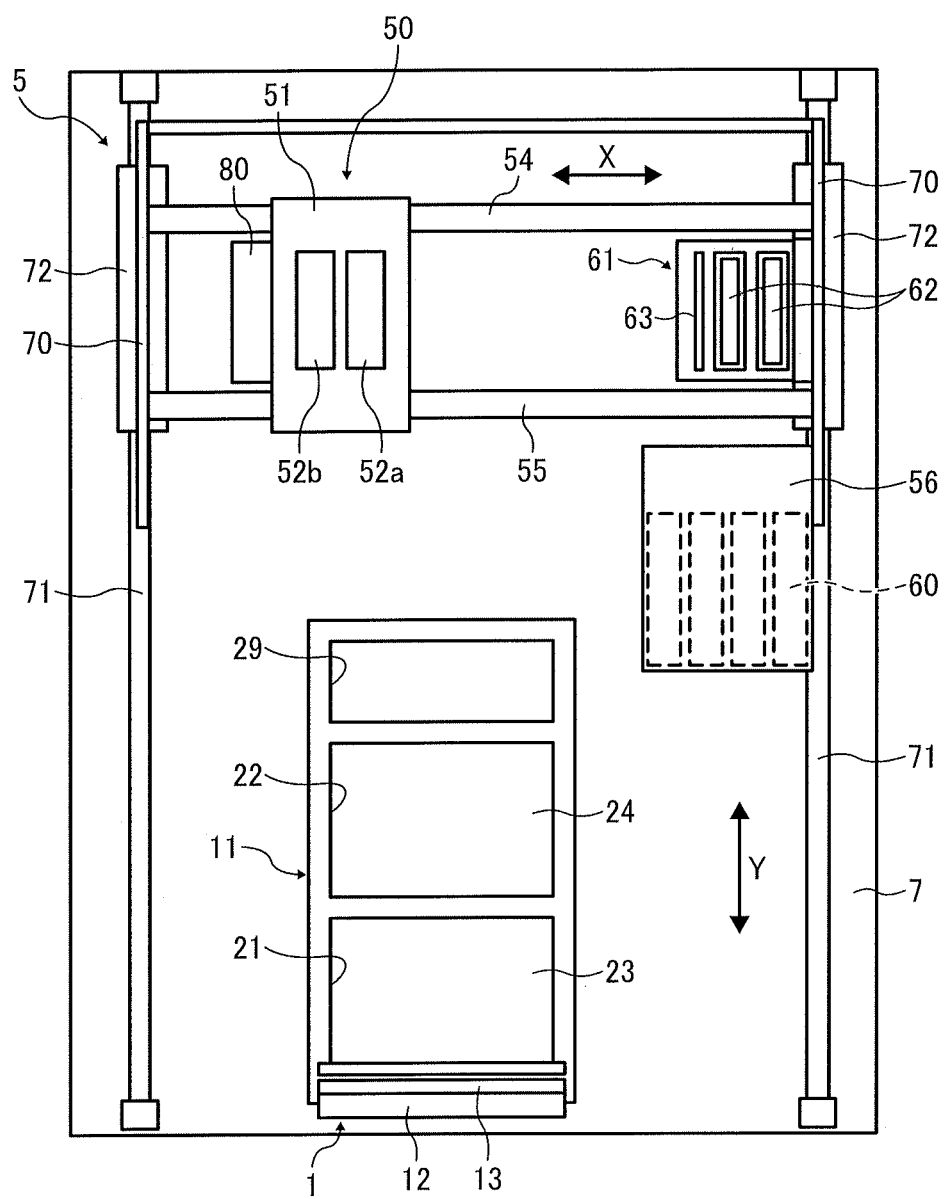
FIG. 1 is a plan view of an apparatus for producing three-dimensional objects according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In additive manufacturing, the (n)th bonded layer may be formed on either a bonded region or a non-bonded region of the (n−1)th layer. When the (n)th bonded layer is formed on the non-bonded region, i.e., powder region, of the (n−1)th layer, by applying a bonding liquid thereto, the powder particles are caused to aggregate to a great extent due to a liquid bridge adhesive force of the bonding liquid. As a result, the lower surface of the (n)th bonded layer, facing the (n−1)th layer, becomes less flattened.

In view of this situation, one object of the present invention is to produce three-dimensional objects with improved accuracy.

Figure 2:
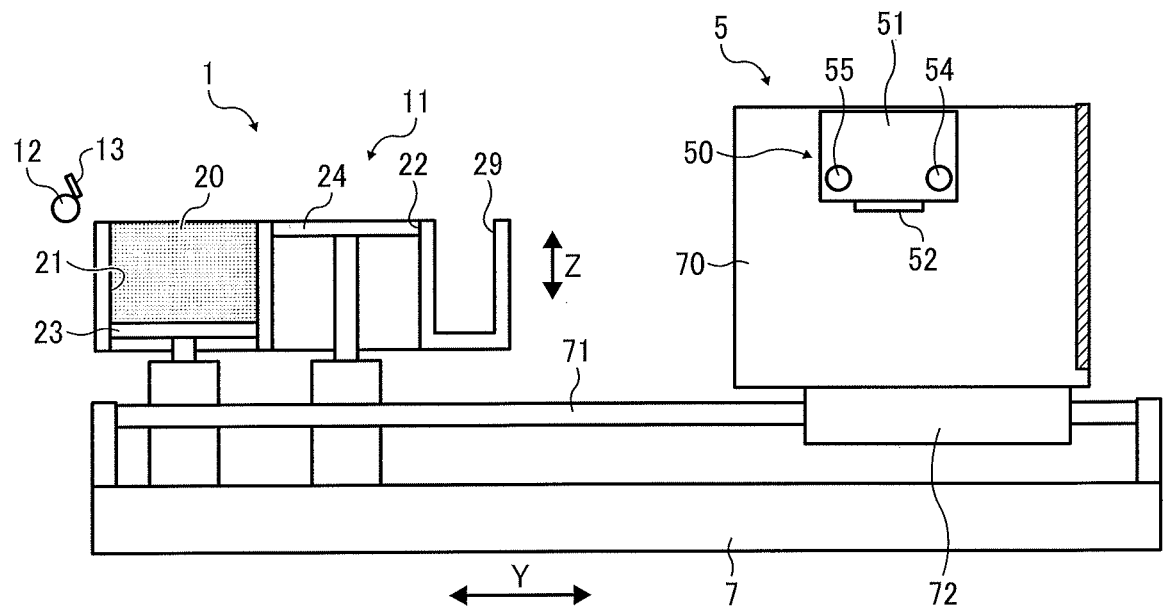
FIG. 2 is a side view of the apparatus illustrated in FIG. 1.
Figure 3:
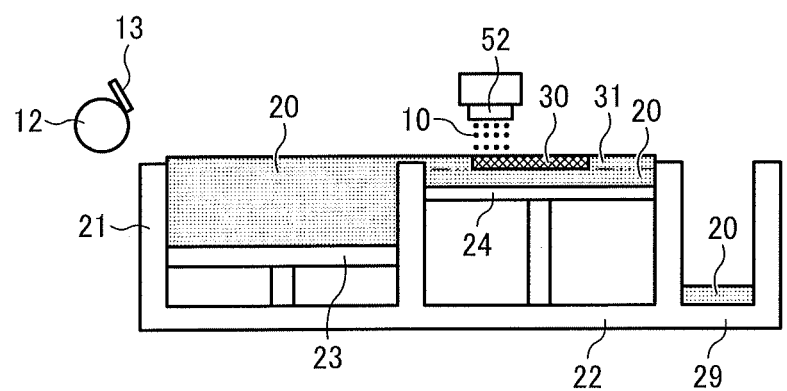
FIG. 3 is a partial cross-sectional view of the apparatus illustrated in FIG. 1.

An apparatus for producing three-dimensional objects in accordance with a first embodiment of the present invention is described below with reference to FIGS. 1 to 3. FIGS. 1 and 2 are plan view and side view, respectively, of an apparatus for producing three-dimensional objects according to the first embodiment. FIG. 3 is a partial cross-sectional view of the apparatus. FIG. 3 illustrates the apparatus in a three-dimensional object shaping operation.

This apparatus for producing three-dimensional objects is of additive manufacturing apparatus. The apparatus includes a first shaping unit 1 and a second shaping unit 5. The second shaping unit 5 discharges a bonding liquid 10 to a powder layer 31 spread in the first shaping unit 1 so that the bonding liquid 10 bonds powder particles included in the powder layer 31 to form a bonded layer 30.

The first shaping unit 1 includes a powder tank 11 and a flattening roller 12. The flattening roller 12 is a rotatable member serving as a flattening member (recoater). As the flattening member, a platy member (blade) may be used in place of the rotatable member.

The powder tank 11 includes a supply tank 21, a shaping tank 22, and a surplus powder receiving tank 29. The supply tank 21 stores a powder 20 to be supplied to the shaping tank 22. In the shaping tank 22, multiple bonded layers 30 are laminated to build up a three-dimensional object. The surplus powder receiving tank 29 receives and stores a surplus of the powder 20 that has been transfer-supplied by the flattening roller 12 without forming the powder layer 31.

A bottom part of the supply tank 21 is freely movable up and down in the vertical direction (height direction) as a supply stage 23. Similarly, a bottom part of the shaping tank 22 is freely movable up and down in the vertical direction (height direction) as a shaping stage 24. Multiple bonded layers 30 are laminated on the shaping stage 24 to form a three-dimensional object. The surplus powder receiving tank 29 may have a mechanism for sucking the powder 20 on a bottom surface thereof. The surplus powder receiving tank 29 may be configured to be easily detachable from the shaping tank 22.

The supply stage 23 is moved up and down in the direction indicated by arrow Z (i.e., height direction) by a motor 27 to be described later. Similarly, the shaping stage 24 is moved up and down in the direction indicated by arrow Z in FIG. 2 by a motor 28 to be described later.

The flattening roller 12 transfer-supplies the powder 20 that has been supplied onto the supply stage 23 of the supply tank 21 to the shaping tank 22. Furthermore, the flattening roller 12 flattens the powder 20 that has been supplied by the flattening roller 12, thus forming the powder layer 31.

The flattening roller 12 is reciprocatable in the direction indicated by arrow Y along a stage surface (i.e., a surface on which the powder 20 is to be placed) of the shaping stage 24, relative to the stage surface of the shaping stage 24. The flattening roller 12 is moved by a reciprocating mechanism 25 to be described later. The flattening roller 12 is rotary-driven by a motor 26 to be described later.

The second shaping unit 5 includes a liquid discharge unit 50 that discharges the bonding liquid 10 onto the powder layer 31 on the shaping stage 24.

The liquid discharge unit 50 includes a carriage 51 and two liquid discharge heads (hereinafter simply "heads") 52*a* and 52*b* mounted on the carriage 51. The number of the heads is not limited to two, and may be one, or three or more. The heads 52*a* and 52*b* may be hereinafter collectively referred to as the heads 52 or head 52.

The carriage 51 is moveably supported by guides 54 and 55. The guides 54 and 55 are supported by side plates 70 disposed on both end parts of the apparatus to be movable up and down.

The carriage 51 is reciprocated in the direction indicated by arrow X (hereinafter simply "X direction", the same may be applied to the directions indicated by arrows Y, Z, etc.), that is coincident with the main scanning direction, by an X-direction scanning motor through a pulley and a belt. The X-direction scanning motor is included in an X-direction scanning mechanism 550 to be described later.

Each of the heads 52a and 52b has two nozzle arrays. Each nozzle array includes multiple nozzles for discharging a bonding liquid. The two nozzle arrays on the head 52a discharge a cyan bonding liquid and a magenta bonding liquid, respectively. The two nozzle arrays on the head 52b discharge a yellow bonding liquid and a black bonding liquid, respectively. The configuration of the heads and the colors of the bonding liquids are not limited to those described above. For example, a colorless bonding liquid including no colorant may be used.

Multiple tanks 60 storing the cyan bonding liquid, the magenta bonding liquid, the yellow bonding liquid, and the black bonding liquid, respectively, are mounted on a tank mounting unit 56. The bonding liquids are supplied to the heads 52a and 52b through supply tubes.

On one end part of the apparatus in X direction, a maintenance mechanism 61 that maintains and recovers the head 52 of the liquid discharge unit 50 is disposed.

The maintenance mechanism 61 includes a cap 62 and a wiper 63. The cap 62 is brought into intimate contact with the nozzle plate (on which nozzles are formed) of the head 52 to suck the bonding liquid from the nozzles. Thus, powder particles have been clogging the nozzles and the bonding liquid having become highly viscous can be discharged. The surface of the nozzle plate is then wiped with the wiper 63 so as to faun a meniscus of the nozzles. (The inside of the nozzle is in a negative pressure state.) The cap 62 covers the nozzle plate of the head 52 while discharging of the bonding liquid is suspended, to prevent intrusion of the powder 20 into the nozzles and drying of the bonding liquid 10.

The second shaping unit 5 includes sliders 72 that are moveably supported by respective guides 71 disposed on a base 7. Thus, the second shaping unit 5 as a whole is reciprocatable in Y direction (i.e., sub-scanning direction) that is perpendicular to X direction (i.e., main scanning direction). The second shaping unit 5 is reciprocated in Y direction by a Y-direction scanning mechanism 552 to be described later.

The liquid discharge unit 50 is moved up and down in Z direction, together with the guides 54 and 55, by a Z-direction elevating mechanism 551 to be described in later.

The first shaping unit 1 is described in detail below.

The powder tank 11 has a box-like shape. The powder tank 11 includes the supply tank 21, the shaping tank 22, and the surplus powder receiving tank 29, the upper face of each of which is opened. The supply stage 23 and the shaping stage 24 disposed inside the supply tank 21 and the shaping tank 22, respectively, are movable up and down.

The side surfaces of the supply stage 23 are in contact with the inner surfaces of the supply tank 21. The side surfaces of the shaping stage 24 are in contact with the inner surfaces of the shaping tank 22. The upper surfaces of the supply stage 23 and the shaping stage 24 are remained horizontal.

The surplus powder receiving tank 29, for receiving a surplus powder discharged out of the shaping tank 22, is disposed next to the shaping tank 22. The surplus powder receiving tank 29 is in a funnel-like shape and has a discharge port 29a at a bottom part for discharging the powder 20.

A surplus of the powder 20, having been transfer-supplied by the flattening roller 12 at the time when forming the powder layer 31, falls into the surplus powder receiving tank 29. The surplus of the powder 20 having fallen into the surplus powder receiving tank 29 may be returned to a powder supply device 554 via a powder collecting recycling device. The powder supply device 554 (to be described later) is configured to supply powder to the supply tank 21.

The powder supply device 554 is disposed above the supply tank 21. The powder supply device 554 supplies powder stored in an internal tank thereof to the supply tank 21 at the time of an initial shaping operation or when the amount of powder in the supply tank 21 has been decreased. The powder supply device 554 supplies powder by a method such as screw conveyer methods and air transport methods.

The flattening roller 12 transfer-supplies the powder 20 from the supply tank 21 to the shaping tank 22 and evens out the supplied powder 20, thus forming the powder layer 31 having a predetermined thickness.

The flattening roller 12 is a rod-like member having a length greater than the inside dimension of the shaping tank 22 and the supply tank 21 (i.e., the width of the powder-supplying part and the powder-storing part). The flattening roller 12 is reciprocated in Y direction (i.e., sub-scanning direction) along the stage surface by a reciprocating mechanism.

The flattening roller 12 horizontally moves above the supply tank 21 and the shaping tank 22, starting from an outer side of the supply tank 21 in Y direction, while being rotated by a motor. By this movement of the flattening roller 12, the powder 20 is transfer-supplied to the shaping tank 22. The flattening roller 12 then flattens the powder 20 supplied to the shaping tank 22 while passing above the shaping tank 22, thus forming the powder layer 31.

As illustrated in FIG. 2, a powder removing plate 13 is disposed in contact with a peripheral surface of the flattening roller 12. The powder removing plate 13 removes the powder 20 adhered to the flattening roller 12.

The powder removing plate 13 moves along with the flattening roller 12 while remaining in contact with the peripheral surface of the flattening roller 12. The powder removing plate 13 may be in contact with the flattening roller 12 so as to face in either the same or opposite direction of rotation of the flattening roller 12 in the flattening operation.

Figure 4:
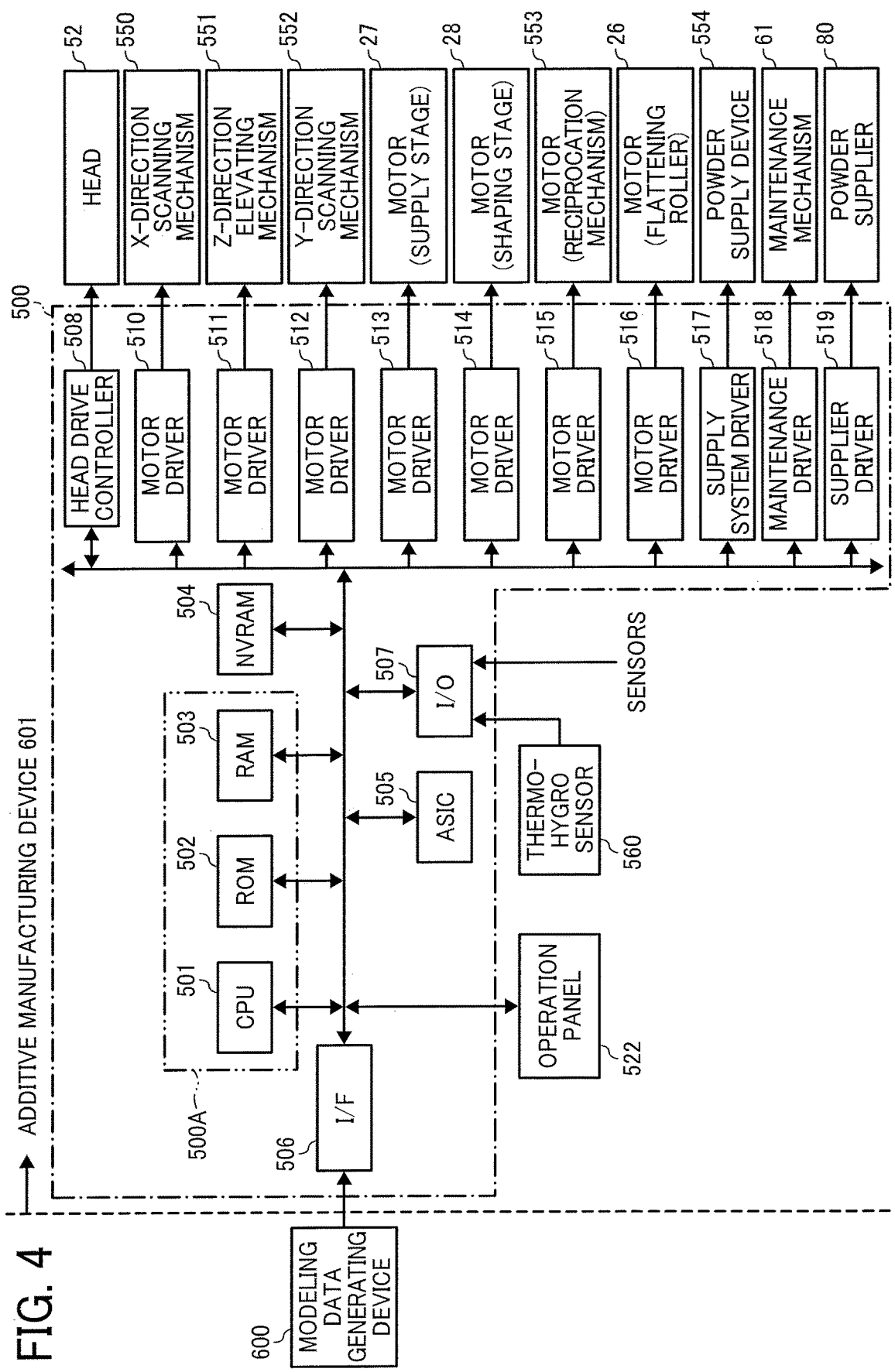
FIG. 4 is a block diagram of a controller of the apparatus illustrated in FIG. 1.

A controller of the above-described apparatus for producing three-dimensional objects is described below with reference to FIG. 4. FIG. 4 is a block diagram of the controller.

A controller 500 includes a main controller 500A including a central processing unit (CPU) 501, a read only memory (ROM) 502, and a random access memory (RAM) 503. The CPU 501 controls the overall apparatus. The ROM 502 stores a program that causes the CPU 501 to control a three-dimensional object shaping operation, and other fixed data. The RAM 503 temporarily stores modeling data and other data.

The controller 500 further includes a non-volatile random access memory (NVRAM) 504 that holds data even when power supply to the apparatus is cut off. The controller 500 further includes an application specific integrated circuit (ASIC) 505 that processes various signals corresponding to image data (i.e., executes image processing) and that processes input and output signals for controlling the overall apparatus.

The controller 500 further includes an interface (I/F) 506 that transmits and receives data and signals used for receiving modeling data from an external modeling data generating device 600.

The modeling data generating device 600 generates modeling data. Modeling data is sliced data generated by slicing the final shape of the three-dimensional object into multiple layers. The modeling data generating device 600 includes an information processing apparatus such as a personal computer.

The controller 500 further includes an input/output device (I/O) 507 that incorporates various sensor detection signals.

The controller 500 further includes a head drive controller 508 that drive-controls the head 52 of the liquid discharge unit 50.

The controller 500 further includes motor drivers 510 and 512. The motor driver 510 drives a motor of the X-direction scanning mechanism 550 that moves the carriage 51 of the liquid discharge unit 50 in X direction (i.e., main scanning direction). The motor driver 512 drives a motor of the Y-direction scanning mechanism 552 that moves the second shaping unit 5 in Y direction (i.e., sub-scanning direction).

The controller 500 further includes a motor driver 511. The motor driver 511 drives a motor of the Z-direction elevating mechanism 551 that moves the carriage 51 of the liquid discharge unit 50 up and down in Z direction. According to another embodiment, the second shaping unit 5 as a whole may be configured to be movable up and down in Z direction.

The controller 500 further includes motor drivers 513 and 514. The motor driver 513 drives the motor 27 that moves the supply stage 23 up and down. The motor driver 514 drives the motor 28 that moves the shaping stage 24 up and down.

The controller 500 further includes motor drivers 515 and 516. The motor driver 515 drives a motor 553 of the reciprocating mechanism 25 that moves the flattening roller 12. The motor driver 516 drives the motor 26 that rotary-drives the flattening roller 12.

The controller 500 further includes a supply system driver 517 and a maintenance driver 518. The supply system driver 517 drives the powder supply device 554 that supplies the powder 20 to the supply tank 21. The maintenance driver 518 drives the maintenance mechanism 61 of the liquid discharge unit 50.

The controller 500 further includes a later-supplier driver 519 that causes a powder later-supplier 80 to supply the powder 20.

To the I/O 507 of the controller 500, detection signals from a thermo-hygro sensor 560 are input. The thermo-hygro sensor 560 detects temperature and humidity of the usage environment for the apparatus and other detection signals from other sensors.

The controller 500 is connected to an operation panel 522 for inputting and displaying necessary information for the apparatus.

As described above, the controller 500 receives modeling data from the modeling data generating device 600. Modeling data is sliced data obtained by slicing the final shape of the three-dimensional object. Each modeling data includes shape data of each bonded layer 30.

The main controller 500A controls the head 52 to discharge the bonding liquid based on the modeling data of the bonded layer 30.

The apparatus for producing three-dimensional objects includes the modeling data generating device 600 and an additive manufacturing device 601.

How a three-dimensional object is produced is described below with reference to FIGS. 5A to 5E. FIGS. 5A to 5E are schematic views illustrating a three-dimensional object shaping operation in accordance with an embodiment of the present invention.

Figure 5A:
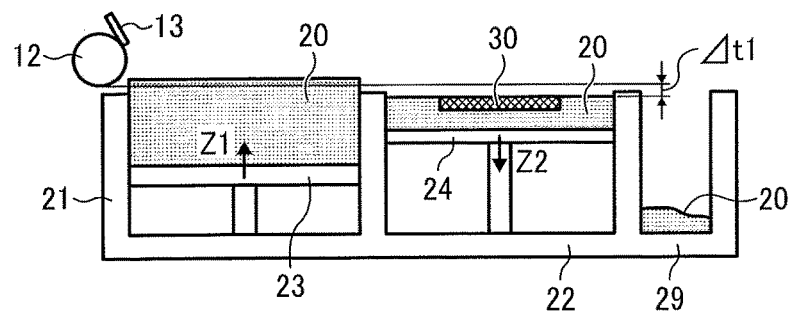
FIGS. 5A to 5E are illustrations of a three-dimensional object shaping operation in accordance with an embodiment of the present invention.

Referring to FIG. 5A, the first bonded layer 30 has already been formed on the shaping stage 24 of the shaping tank 22.

To faun a next bonded layer 30 on the first bonded layer 30, as illustrated in FIG. 5A, the supply stage 23 of the supply tank 21 is lifted up in Z1 direction and the shaping stage 24 of the shaping tank 22 is lowered in Z2 direction.

The distance of lowering of the shaping stage 24 is so determined that the distance between the upper surface of a powder layer 31 to be formed in the shaping tank 22 and the lowest part of the flattening roller 12 becomes $\Delta t1$. The distance $\Delta t1$ corresponds to the thickness of the powder layer 31 to be formed. Preferably, the distance $\Delta t1$ is in the range of from several tens to several hundreds of micrometers.

The flattening roller 12 is disposed above the upper end surfaces of the supply tank 21 and the shaping tank 22 with a gap therebetween. Thus, as the flattening roller 12 transfer-supplies the powder 20 to the shaping tank 22 and flattens the supplied powder 20, the surface of the resulting powder layer 31 is leveled higher than the upper end surfaces of the supply tank 21 and the shaping tank 22.

Such a configuration reliably prevents the flattening roller 12 from contacting the upper end surfaces of the supply tank 21 and the shaping tank 22, thus preventing damage of the flattening roller 12. If the surface of the flattening roller 12 is damaged, undesirable lines (grooves) will appear on the surface of the powder layer 31 and degrade flatness of the surface.

Figure 5B:
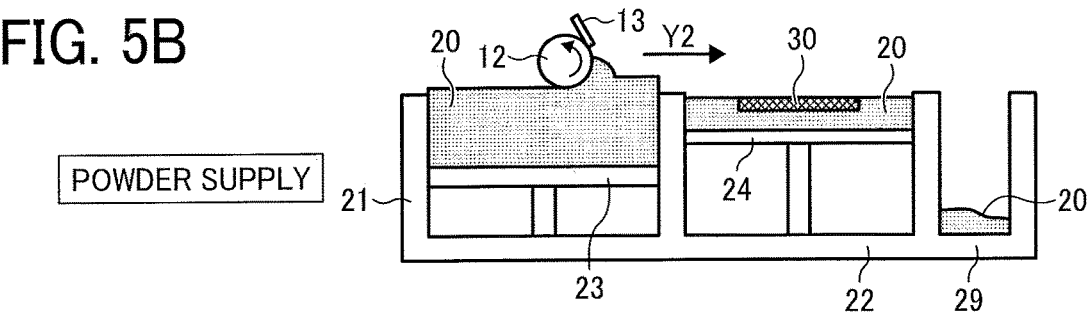

Next, as illustrated in FIG. 5B, a part of the powder 20 positioned higher than the upper surface level of the supply tank 21 is transfer-supplied to the shaping tank 22 as the flattening roller 12 moves in Y2 direction while rotating in the counter direction (indicated by arrow in the flattening roller 12). This process may be hereinafter called "powder supply process".

Figure 5C:
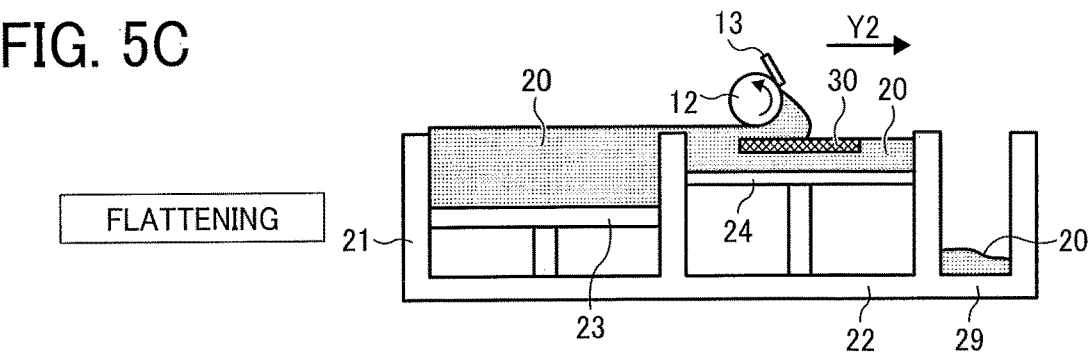

Next, as illustrated in FIG. 5C, the flattening roller 12 is moved in parallel with the stage surface of the shaping stage 24 of the shaping tank 22 to form a powder layer 31 having the predetermined thickness $\Delta t1$ on the bonded layer 30 on the shaping stage 24. This process may be hereinafter called "flattening process". A surplus of the powder 20 that has not been used for formation of the powder layer 31 falls into the surplus powder receiving tank 29.

Figure 5D:
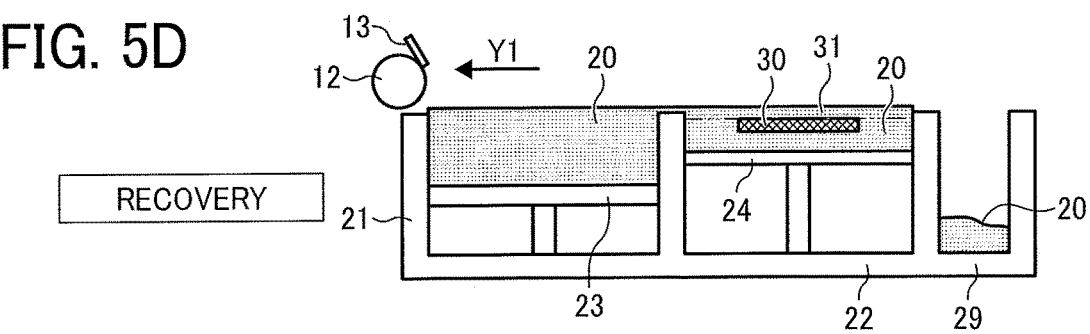

After the powder layer 31 has been formed, as illustrated in FIG. 5D, the flattening roller 12 is moved in Y1 direction to be returned to the initial position. This process may be hereinafter called "recovery process".

The flattening roller 12 is configured to move with remaining a constant distance from the upper surface level of the shaping tank 22 and the supply tank 21. Owing to this configuration, the flattening roller 12 can form the powder layer 31 having the uniform thickness $\Delta t1$ in the shaping tank 22 or on the bonded layer 30 already formed, while transporting the powder 20 to the shaping tank 22.

Figure 5E:
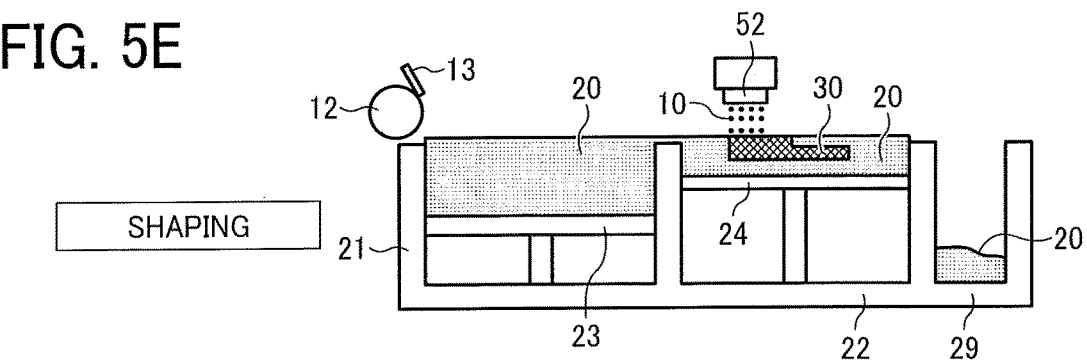

Next, as illustrated in FIG. 5E, the liquid discharge unit 50 discharges droplets of the bonding liquid 10 from the head 52 onto the powder layer 31 to form a next bonded layer 30. This process may be hereinafter called "shaping process".

The bonded layer 30 may be formed as the bonding liquid 10 discharged from the head 52 is mixed with the powder 20, an adhesive included in the powder 20 is thereby dissolved, and the dissolved adhesive molecules bond the particles of the powder 20.

Next, the powder supply process and the flattening process, for forming a powder layer 31, and the shaping process in which the head 52 discharges the bonding liquid 10 onto the powder layer 31 are repeated again to form a new bonded layer 30. The new bonded layer 30 and the existing bonded layer 30 therebelow are integrally combined and formed into a part of a three-dimensional object.

The powder supply process and the flattening process, for forming the powder layer 31, and the shaping process in which the head 52 discharges the bonding liquid 10 onto the powder layer 31 are further repeated a required number of times to complete formation of the three-dimensional object.

The powder 20 and the bonding liquid 10 are described in detail below.

The powder 20 is a powder material for shaping three-dimensional objects. The powder material includes a base material and a cover layer having a thickness of from 5 to 500 nm. The cover layer includes a water-soluble organic material as a binder. When acted on by a cross-linker-containing water (e.g., the bonding liquid), the water-soluble organic material dissolves therein and becomes cross-linkable.

Thus, as the cross-linker-containing water is applied, the water-soluble organic material dissolves therein and undergoes a cross-linking reaction by an action of a cross-linker contained in the cross-linker-containing water.

As the cross-linker-containing water (i.e., the bonding liquid 10) is discharged onto a thin layer of the powder material (i.e., the powder layer 31), the water-soluble organic material gets dissolved and undergoes a cross-linking reaction. As a result, powder particles in the powder layer 31 get bonded to be hardened, thus forming a bonded layer 30.

The base material is not limited to a specific substance so long as it is in the form of powder or granules. For the purpose of obtaining three-dimensional objects having high strength, metals which are capable of being sintered and ceramics are preferably used as the base material.

Specific examples of such metals include, but are not limited to, Ni, Ni-base alloy, Cu, Cu-base alloy, Fe, Fe-base alloy, Ti, Ti-base alloy, Al, Al-base alloy, and stainless steel. Specific examples of the ceramics include, but are not limited to, alumina, magnesia, zirconia, silica, silicon carbide, and silicon nitride.

The water-soluble organic material is not limited to a specific substance so long as it is water-soluble and becomes cross-linkable by an action of a cross-linker.

In the present disclosure, the water-soluble organic material is defined as an organic material, 90% by mass or more of which is soluble in 100 times the mass of water having a temperature of 30° C. For example, 90% by mass or more of 1 g of the water-soluble organic material is soluble in 100 g of water having a temperature of 30° C.

Preferably, the viscosity of a 4% (by mass) solution of the water-soluble organic material, at a temperature of 20° C., is 40 mPa·s or less, more preferably in the range of from 1 to 35 mPa·s, and most preferably in the range of from 5 to 30 mPa·s.

Viscosity of the water-soluble organic material can be measured based on a method according to JIS K7117.

The cross-linker-containing water, serving as the bonding liquid, is not limited in composition so long as a cross-linker is contained in an aqueous medium. The cross-linker-containing water may include substances other than the aqueous medium and the cross-linker.

Which type of substances are to be added to the cross-linker-containing water is determined depending on the means for applying the cross-linker-containing water, frequency of use, and amount of use of the cross-linker-containing water. For example, in a case in which the cross-linker-containing water is applied by means of liquid discharging, an effect on nozzle clogging may be taken into consideration in selecting substances to be added.

Specific examples of the aqueous medium include, but are not limited to, water, alcohols (e.g., ethanol), ethers, and ketones. Among these materials, water is most preferable. The aqueous medium may be a mixture of water and a slight amount of a substance other than water (e.g., an alcohol).

When the above-described powder material and cross-linker-containing water (bonding liquid) are used in combination, the head is more improved in durability compared to a case in which a binder for binding the powder (base material) is discharged from a liquid discharge head.

Figure 6:
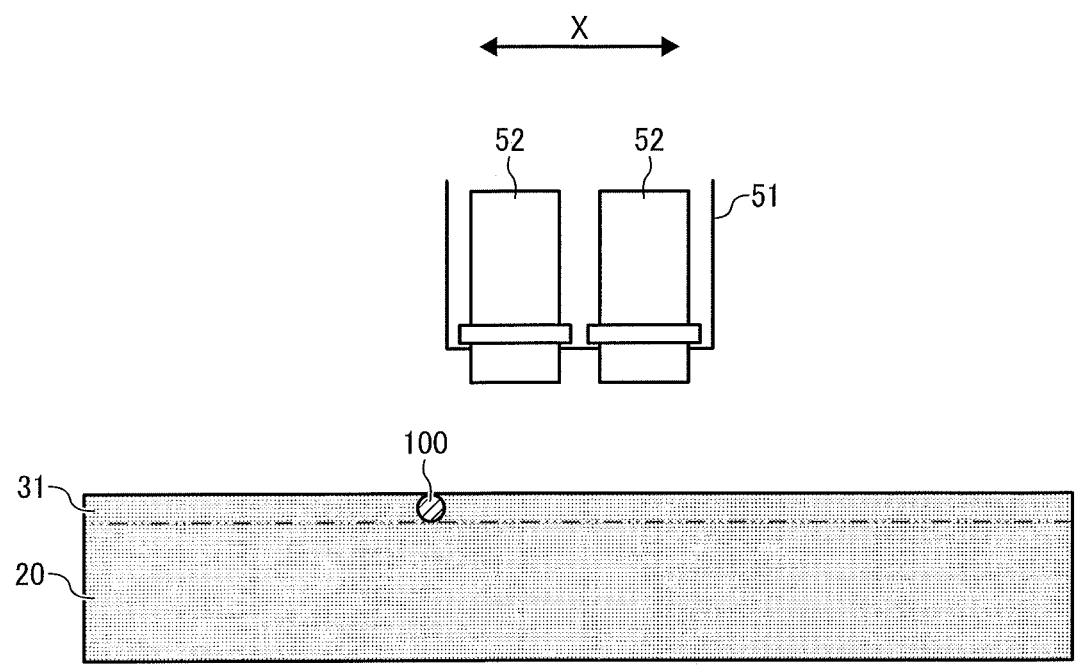
FIG. 6 is an illustration of a situation when a droplet of a bonding liquid is discharged onto a powder layer.

A situation when a droplet of the bonding liquid is discharged onto the powder layer is illustrated in FIG. 6.

Specifically, FIG. 6 illustrates a situation when a droplet 100 of the bonding liquid 10, discharged based on modeling data having a pitch of 300×300 dpi (corresponding to approximately 85 μm), permeates the powder layer 31.

The quantity of the droplet 100 has been adjusted so that the droplet 100 can permeate the powder layer 31 in a thickness direction for a distance corresponding to the thickness of the powder layer (e.g., 100 μm).

The optimum quantity of the droplet 100 can be experimentally determined as follows. First, the powder 20 is spread into a powder layer having a thickness of 100 μm on a glass plate, and the droplet 100 is dropped on the powder layer. The glass plate is observed with a camera from the side opposite to the surface on which the droplet 100 is dropped, to determine whether the droplet 100 of the bonding liquid 10 has permeated the powder layer having a thickness of 100 μm. This experiment is repeatedly performed while varying the quantity of the droplet 100, to determine the optimum quantity of the droplet 100 that makes the droplet 100 completely permeate the powder layer having a thickness of 100 μm in a thickness direction. In the present embodiment, the experimentally-determined optimum quantity of the droplet 100 that makes the droplet 100 completely permeate the powder layer 31 was about 200 pl per droplet.

Figure 7:
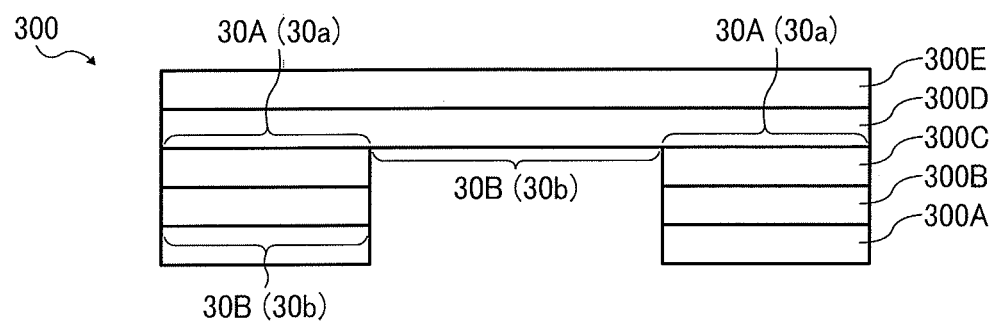
FIG. 7 is a schematic view of a target three-dimensional object.
Figure 8A:
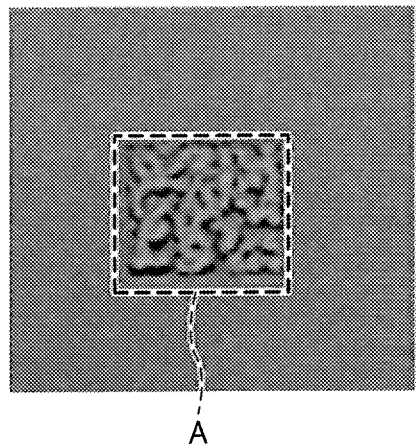
FIGS. 8A and 8B are photographs of powder layers formed in different numbers of times of scan.
Figure 8B:
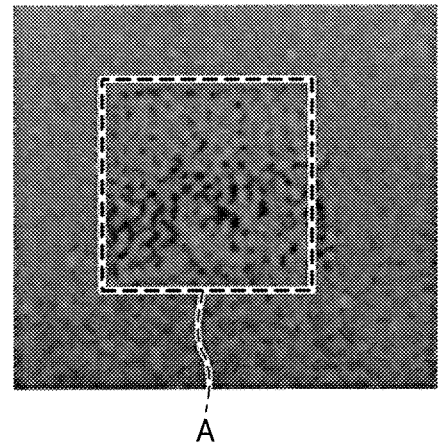

A relation between the shape of a target three-dimensional object and the number of times of scan is described below with reference to FIGS. 7 and 8A-8B. FIG. 7 is an illustration of a target three-dimensional object. FIGS. 8A and 8B are photographs of powder layers formed in different numbers of times of scan.

A three-dimensional object 300 illustrated in FIG. 7 is to be formed by laminating the first to fifth bonded layers 300A to 300E.

When forming the first bonded layer 300A, no bonded layer exists therebelow. There exists only a region consisting of the powder 20. Such a region is hereinafter referred to as "new bonding region 30B. The new bonding region 30B is formed into an overhang portion 30b in a resulting bonded layer.

When forming the second bonded layer 300B and the third bonded layer 300C, the first bonded layer 300A and the second bonded layer 300B, respectively, have already been formed therebelow.

When forming the fourth bonded layer 300D, both the third bonded layer 300C and the new bonding region 30B exist therebelow. Here, the third bonded layer 300C is also referred to as "existing bonding region 30A". The new bonding region 30B consists of the powder 20, as described above. The existing bonding region 30A is formed into a non-overhang portion 30a in a resulting bonded layer.

When forming the fifth bonded layer 300E, the fourth bonded layer 300D has already been formed therebelow.

When forming a bonded layer 30 with no bonded layer existing therebelow, as is the case of forming the first bonded layer 300A, by applying a predetermined amount of the bonding liquid 10 onto the powder layer 31 in one time of scan of the carriage 51, the surface of the powder layer 31 comes into a state illustrated in FIG. 8A.

On the other hand, when forming a bonded layer 30 with no bonded layer existing therebelow, as is the case of forming the first bonded layer 300A, by applying a predetermined amount of the bonding liquid 10 onto the powder layer 31 in four times of scan of the carriage 51, the surface of the powder layer 31 comes into a state illustrated in FIG. 8B.

In FIGS. 8A and 8B, the region A indicates a region where the bonding liquid 10 has been applied.

In a case in which a predetermined amount of the bonding liquid is applied to a new bonding region in one time of scan, the whole region is applied with the bonding liquid almost at the same time. Thus, the whole region is acted on by a liquid bridge adhesive force almost at the same time, generating coarse and dense portions within the region, resulting in poor accuracy in shaping a three-dimensional object.

On the other hand, in a case in which a predetermined amount of the bonding liquid is applied to a new bonding region in four times of scan, the powder 20 is caused to aggregate in each time of scan due to a liquid bridge adhesive force. However, the influence of the liquid bridge adhesive force is exerted only in a limited range, i.e., in each dot, since adjacent dots are applied with the bonding liquid not at the same time. In the present embodiment, the bonding liquid is applied at a pitch of 300×300 dpi, i.e., about 84.65 µm. As a result, a three-dimensional object is obtained at a high degree of accuracy.

A case in which a predetermined amount of the bonding liquid is applied in four times of scan, in other words, in four batches, is described in detail below with reference to FIGS. 9 and 10A-10D.

Figure 9:
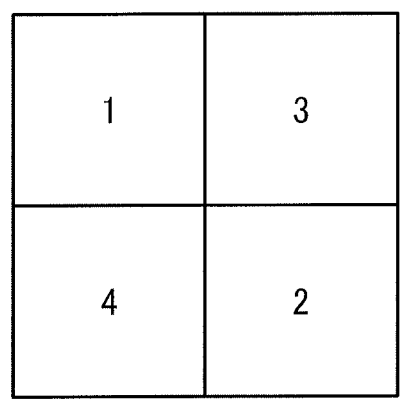
FIG. 9 is an illustration for explaining the order of application of a predetermined amount of a bonding liquid in four times of scan.
Figure 10:
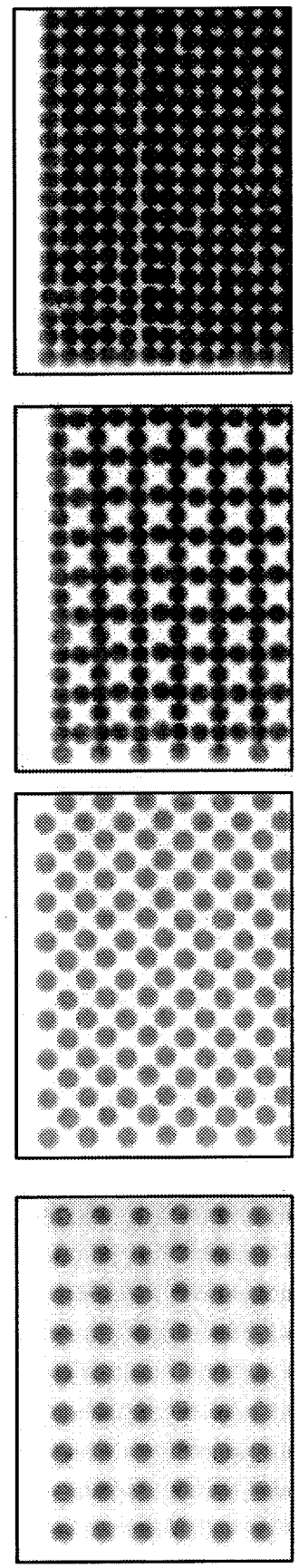
FIGS. 10A to 10D are photographs of a glossy paper sheet on which the bonding liquid has been discharged in the order illustrated in FIG. 9.

First, a region to be bonded by one drop (i.e., a predetermined amount) of the bonding liquid is divided into four blocks 1 to 4, as illustrated in FIG. 9. Each side of each block has a length of about 84.65 µm when the shaping resolution is 300×300 dpi. The bonding liquid is applied to the blocks 1 to 4 in ascending order.

FIGS. 10A to 10D illustrate photographs of a glossy paper sheet on which the bonding liquid has been discharged in the above-described manner.

Since the bonding liquid is applied to adjacent blocks not at the same time, a liquid bridge adhesive force exerts an influence in a limited range, i.e., in each block. The time interval between scans is set such that a period during which powder particles are caused to migrate due to the liquid bridge adhesive comes within the time interval.

In the present embodiment, the number of times of scan is four, but is not limited thereto. The number of times of scan is determined depending on the degree of migration of the powder particles caused by the liquid bridge adhesive force. The degree of migration of powder particles is determined based on physical properties of the powder and the bonding liquid.

A new bonding region in the (n)th powder layer, below which the (n−1)th bonded layer does not exists, is applied with a predetermined amount of the bonding liquid in multiple times. Here, n represents an integer of 1 or above. In other words, an overhang portion in the (n)th bonded layer, below which the (n−1)th bonded layer does not exist, is formed by multiple times of application of the predetermined amount of the bonding liquid.

On the other hand, the number of times of scan increases, the time required for shaping a three-dimensional object is elongated.

To avoid elongation of the time required for shaping, an existing bonding region in the (n)th powder layer, below which the (n−1)th bonded layer exists, is applied with the bonding liquid in a smaller number of times than the new bonding region is. In other words, a non-overhang portion in the (n)th bonded layer, below which the (n−1)th bonded layer exists, is formed by a smaller number of times of application of the bonding liquid than the overhang portion is. The smaller the number of times of application of the bonding liquid, the more suppressed the increase in the time required for shaping a three-dimensional object. In the present embodiment, a predetermined amount of the bonding liquid is applied in one time of scan.

In the existing bonding region in the (n)th powder layer, below which the (n−1)th bonded layer exists, the bonding liquid having been applied to the (n−1)th layer exerts an effect for holing the powder 20 in the (n)th layer. Therefore, migration of powder particles in the (n)th powder layer, that may be caused due to a liquid bridge adhesive force of the bonding liquid, is suppressed. Thus, even when the existing bonding region is applied with the bonding liquid in a smaller number of times of application of the bonding liquid than the new bonding region is, for example, in one time of scan, shaping accuracy does not deteriorate very much.

In the present embodiment, the existing bonding region in the (n)th powder layer is applied with the bonding liquid when the new bonding region is applied with the bonding liquid for the last time. However, the time when the existing bonding region is applied with the bonding liquid is not limited thereto, and may be synchronized with any time when the new bonding region is applied with the bonding liquid.

Figure 11:
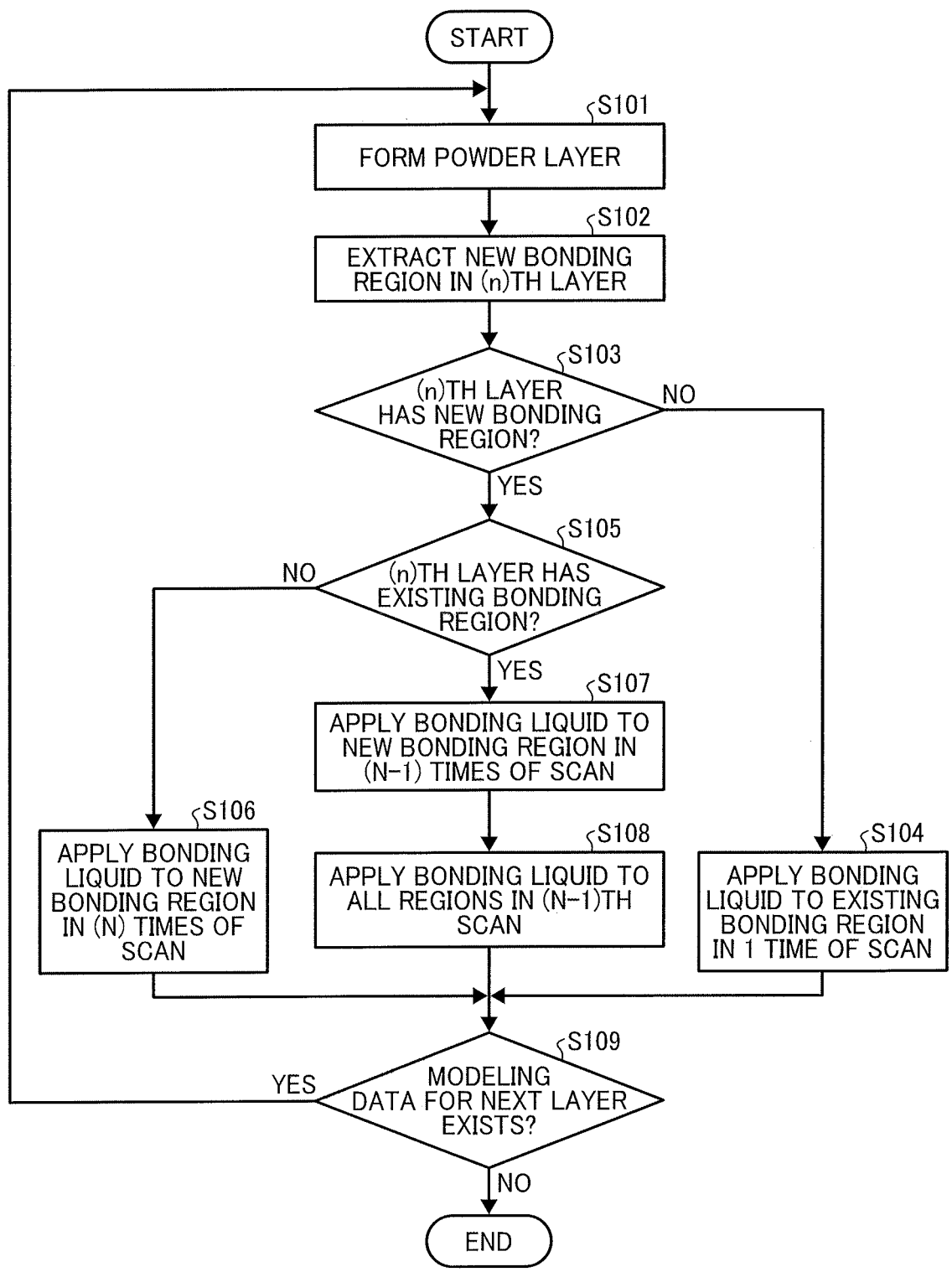
FIG. 11 is a flowchart of a three-dimensional object shaping operation according to the first embodiment of the present invention.

FIG. 11 is a flowchart of a three-dimensional object shaping operation, performed by the controller 500, according to the first embodiment of the present invention.

The shaping operation starts as the controller 500 receives modeling data from the modeling data generating device 600. In S101, the powder layer 31 is formed in the shaping tank 22. In S102, modeling data for the (n)th layer is read out and compared with that for the (n−1)th layer underlying the (n)th layer, to extract a new bonding region 30B in the (n)th layer, below which the (n−1)th bonded layer 30 does not exist.

In S103, whether the (n)th layer has a new bonding region 30B or not is determined.

When the (n)th layer has no new bonding region 30B, in other words, the whole (n)th layer consists of an existing bonding region 30A, in S104, the (n)th powder layer 31 is applied with the bonding liquid 10 (droplet 100) in one time of scan, thus becoming the (n)th bonded layer 30.

When the (n)th layer has a new bonding region 30B, in S105, whether the (n)th layer has an existing bonding region 30A or not is determined.

When the (n)th layer has no existing bonding region 30A, in other words, the whole (n)th layer consists of a new bonding region 30B (i.e., n=1), in S106, the (n)th powder layer 31 is applied with a predetermined amount of the bonding liquid 10 in a predetermined number (N) of times of scan (where N represents an integer of 2 or above), thus becoming the (n)th bonded layer 30. In the embodiment described above, the predetermined number N is 4.

When the (n)th layer has an existing bonding region 30A, in other words, the (n)th layer has both a new bonding region 30B and an existing bonding region 30A, in S107, the new bonding region 30B in the (n)th powder layer 31 is applied with a part of a predetermined amount of the bonding liquid 10 in (N−1) times of scan. The other part of the predetermined amount of the bonding liquid 10 is kept unused to be used for the (N)th scan.

Next, in S108, in the (N)th scan, the new bonding region 30B is applied with the remaining part of the predetermined amount of the bonding liquid 10, and the existing bonding region 30A is applied with a predetermined amount of the bonding liquid 10 in one time of scan. Thus, the (n)th bonded layer 30 is formed.

In S109, whether modeling data for the next layer exists or not is determined. When modeling data for the next layer exists, the above processes are repeated. When modeling data for the next layer does not exist, the shaping operation ends.

The above three-dimensional object shaping operation is further described in detail below with reference to FIG. 12.

Figure 12:
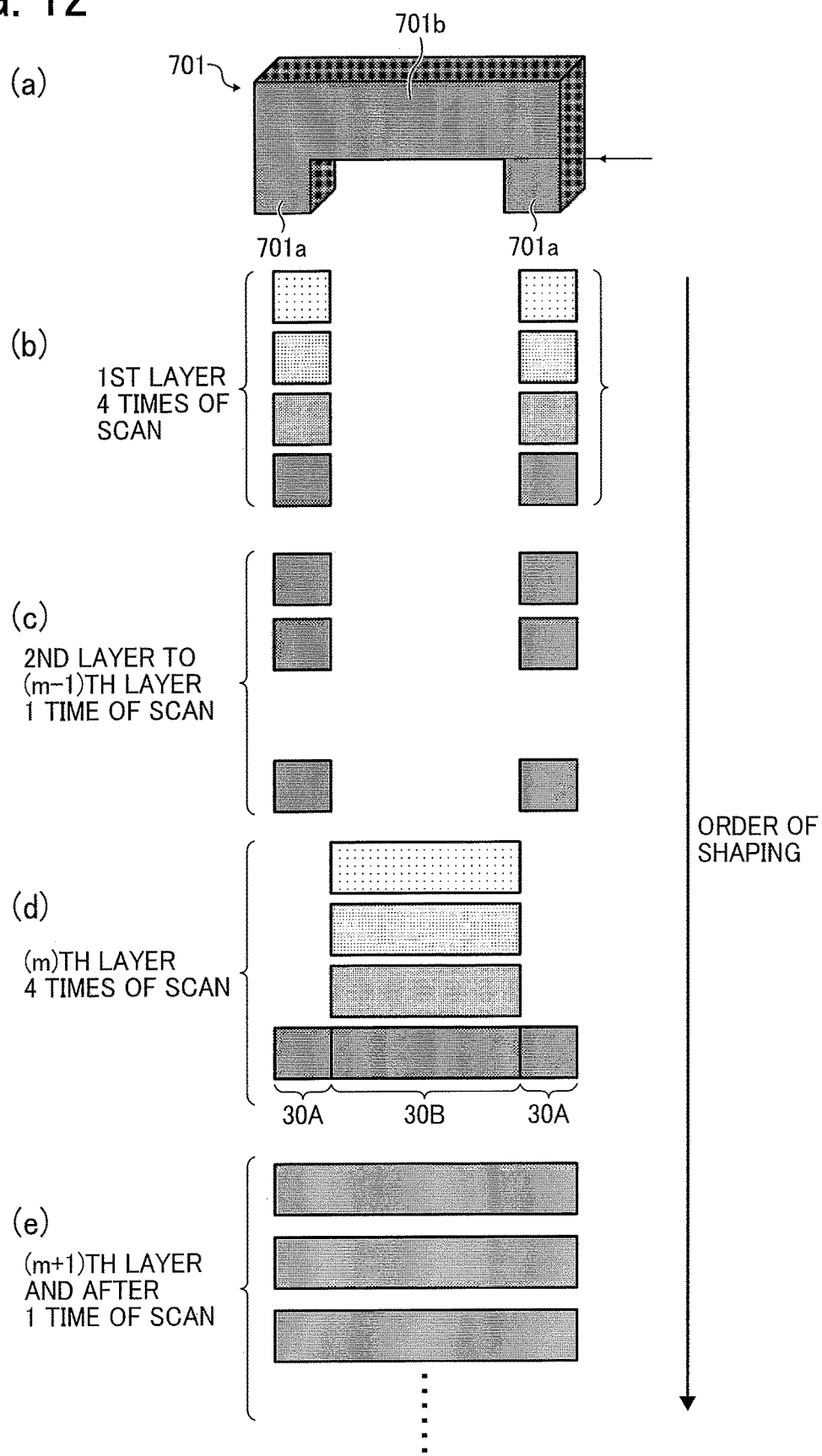
FIG. 12 is an illustration for explaining the three-dimensional object shaping operation according to the first embodiment of the present invention.

FIG. 12 illustrates a case in which a three-dimensional object 701 illustrated in scheme (a) is to be formed. The three-dimensional object 701 has two leg parts 701a and a bridge part 701b bridged between the leg parts 701a.

The first layer of each leg part 701a consists of a new bonding region 30B. Thus, as illustrated in scheme (b), a predetermined amount of the bonding liquid 10 is applied thereto in four times of scan.

When the (m)th layer is defined as the first layer of the bridge part 701b, the second to (m−1)th layers of each leg part 701a each consist of an existing bonding region 30A. Thus, as illustrated in scheme (c), a predetermined amount of the bonding liquid 10 is applied thereto in one time of scan.

The (m)th layer, corresponding to the first layer of the bridge part 701b, has both existing bonding regions 30A (above the leg parts 701a) and a new bonding region 30B (above a part other than the leg parts 701a).

After the new bonding region 30B is applied with the bonding liquid 10 in three times of scan, both the new bonding region 30B and the existing bonding regions 30A are applied with the bonding liquid 10 in the fourth scan, as illustrated in scheme (d).

The (m+1)th layer and above layers each consist of an existing bonding region 30A. Thus, as illustrated in scheme (e), a predetermined amount of the bonding liquid 10 is applied thereto in one time of scan.

The existing bonding region 30A in the (m)th layer, below which the (m−1)th bonded layer 30 exists, is applied with the predetermined amount of the bonding liquid in the fourth scan. Such a region that can be bonded in one time of scan without degrading shaping accuracy is bonded in one time of scan.

There is a possibility that, when a bonded layer is formed in multiple times of scan, micro-voids are generated in a boundary between regions bonded in different times of scan. By forming a bonded layer in one time of scan, generation of such micro-voids can be avoided and shaping density is improved.

At the same time, deterioration of productivity (shaping speed) is suppressed.

In the present embodiment, the existing bonding region 30A and the new bonding region 30B in the (m)th layer are applied with the bonding liquid under different controls. Alternatively, according to another embodiment, the control for applying the bonding liquid can be differed layer by layer. Specifically, in a case in which both an existing bonding region 30A and a new bonding region 30B exist in the (m)th layer, both the existing bonding region 30A and the new bonding region 30B may be applied with the bonding liquid in a greater number of times of scan than the (m)th layer is in a case in which the (m)th layer includes no new bonding region 30B. In this case, there is no need to perform different controls in a single layer, simplifying the control for applying the bonding liquid.

Figure 13A:
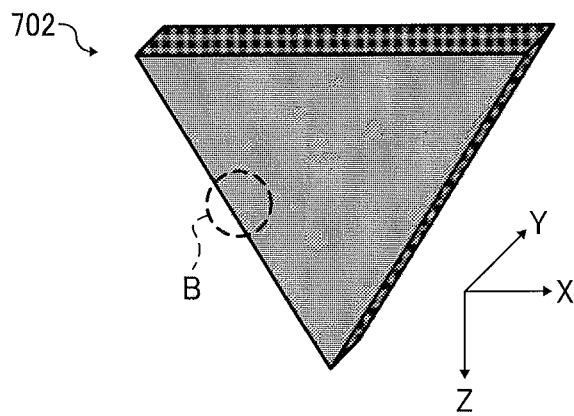
FIGS. 13A and 13B are schematic views of a target three-dimensional object according to a second embodiment of the present invention.
Figure 13B:
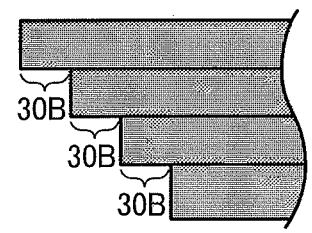
Figure 14A:
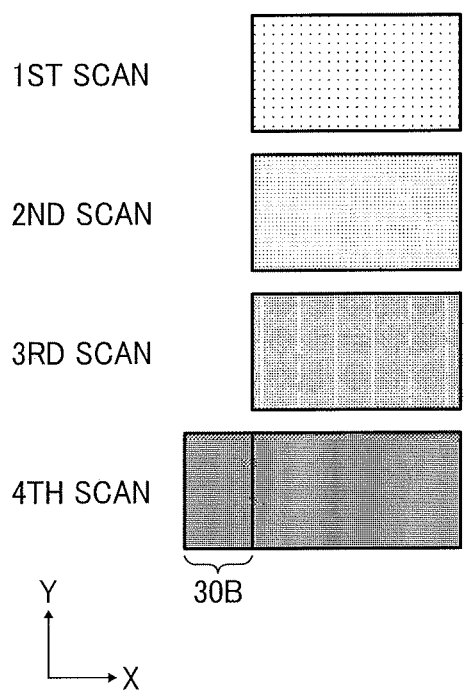
FIGS. 14A and 14B are illustrations for explaining a three-dimensional object shaping operation according to the second embodiment of the present invention.
Figure 14B:
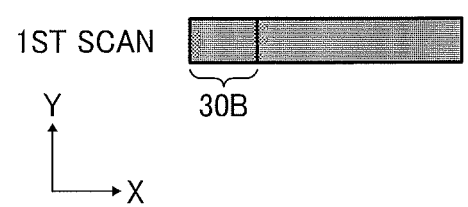

A three-dimensional object shaping operation according to a second embodiment of the present invention is described below with reference to FIGS. 13A-13B and 14A-14B. FIG. 13A is a schematic view of a target three-dimensional object according to the second embodiment. FIG. 13B is a magnified view of a region B encircled by dotted lines in FIG. 13A. FIGS. 14A and 14B are illustrations of a shaping operation according to the second embodiment.

Referring to FIG. 13A, a three-dimensional object 702 has a triangle shape having oblique sides. As is clear from FIG. 13B, in each oblique side, a new bonding region 30B appears in each bonded layer 30.

Thus, if the three-dimensional object 702 is formed through four times (N=4) of application of the bonding liquid in each layer, it will take a long time to complete shaping thereof.

To avoid such a disadvantage, in the present embodiment, the number of times of scan is varied depending on the area of the new bonding region 30B. For example, when the new bonding region 30B has an area equal to or greater than a preset threshold, the bonding liquid is applied thereto in two times (N=2) of scan. When the new bonding region 30B has an area less than the threshold, the bonding liquid is applied thereto in one time (N=1) of scan.

More specifically, when the new bonding region 30B is longer in Y direction and has a relatively large area, as illustrated in FIG. 14A, the bonding liquid is applied thereto in four times of scan. When the new bonding region 30B is shorter in Y direction and has a relatively small area, as illustrated in FIG. 14B, the bonding liquid is applied thereto in one time of scan.

In a case in which the area of the new bonding region is relatively small, a bonded layer can be formed in one time of scan, since migration of powder particles, caused due to a liquid bridge adhesive force, exerts a limited influence on shaping accuracy.

As the number of times of scan is varied depending on the area of the new bonding region, shaping accuracy is improved while deterioration of shaping speed is suppressed.

In the above-described embodiments, modeling data for the (n)th layer and that for the (n−1)th layer are compared to extract a new bonding region or to determine whether a new bonding region exists or not. Alternatively, according to another embodiment, the modeling data generating device 600 may previously add data indicating a new bonding region to modeling data for the (n)th layer, and transfer the resulting data to the controller.

Figure 15A:
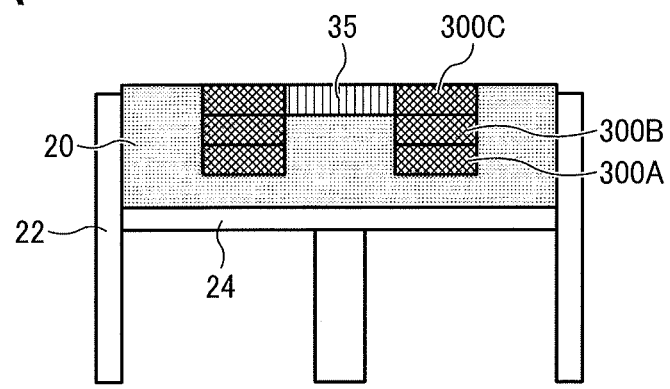
FIGS. 15A to 15C are illustrations of a three-dimensional object shaping operation according to a third embodiment of the present invention.
Figure 15B:
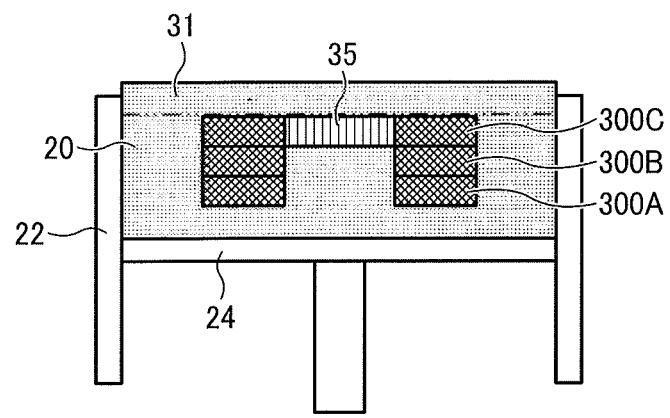
Figure 15C:
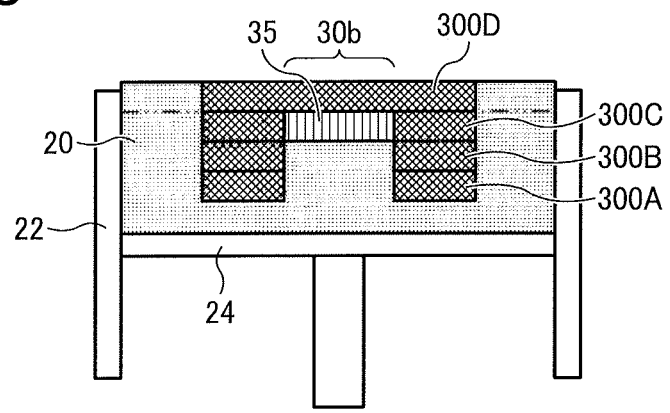

A third embodiment of the present invention is described below with reference to FIGS. 15A to 15C. FIGS. 15A to 15C are illustrations of a three-dimensional object shaping operation according to the third embodiment.

In the present embodiment, a frame pattern 35 is formed in a part of a non-bonded region of the (n−1)th layer, above which an overhang portion 30b of the (n)th bonded layer 30 (to be described later referring to FIG. 16B) is to be formed. As described, the overhang portion 30b is formed by bonding powder particles in a new bonding region 30B.

In a case in which the three-dimensional object 300 illustrated in FIG. 7 is to be formed according to the present embodiment, first, the first bonded layer 300A and the second bonded layer 300B are formed in series, as illustrated in FIG. 15A.

Next, the third ((n−1) the) bonded layer 300C and the fourth ((n)th) bonded layer 300D are to be formed. Here, the fourth bonded layer 300D has an overhang portion 30b below which the third bonded layer 300C does not exist.

Thus, when forming the third bonded layer 300C, a preset frame pattern 35 is formed in a part of non-bonded region in the third layer, above which the overhang portion 30b of the fourth bonded layer 300D is to be formed. The frame pattern 35 may be a partially-thinned pattern, such as net-like pattern, stripe-like (line-like) pattern, or grid-like pattern, or a pattern formed with a less amount of the bonding liquid for the purpose of suppressing permeation.

Next, a powder layer 31 is formed, as illustrated in FIG. 15B, and thereafter the powder layer 31 is formed into the fourth bonded layer 300D, as illustrated in FIG. 15C.

Since the first bonded layer 300A can be regard as consisting of an overhang portion 30b, it is preferable that a frame pattern is previously formed in a region underlying the first bonded layer 300A.

Figure 16A:
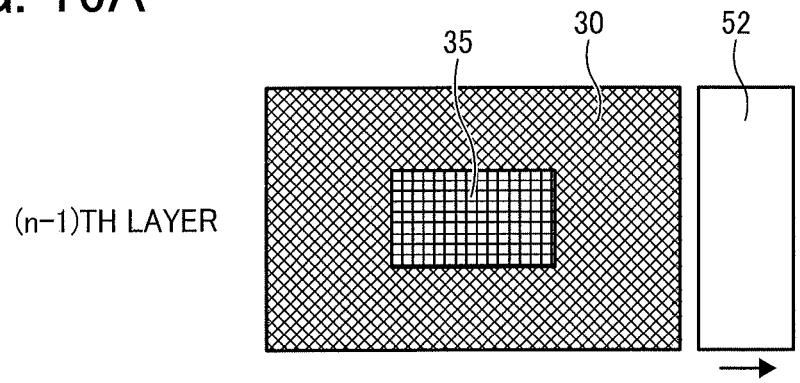
FIGS. 16A to 16C are plan views for explaining an operation for forming the (n−1)th and (n)th layers according to the third embodiment of the present invention.
Figure 16B:
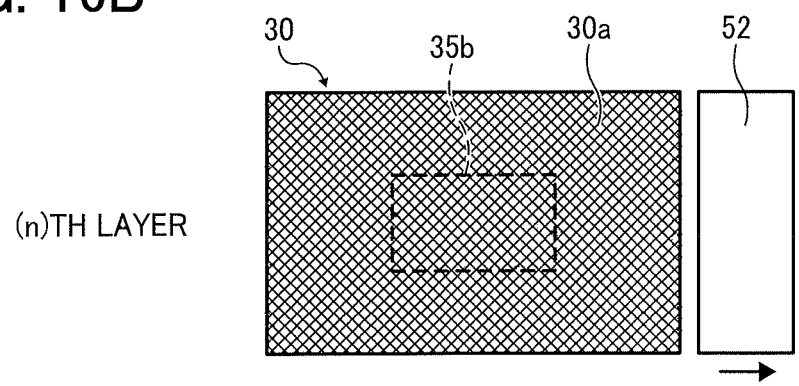
Figure 16C:
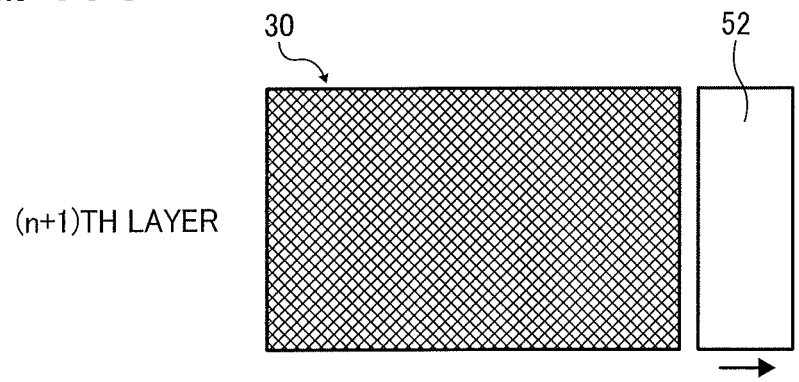

An operation for forming the (n)th layer is described below with reference to FIGS. 16A to 16C. FIGS. 16A to 16C are plan views for explaining the operation for forming the (n)th layer.

As illustrated in FIG. 16A, the (n−1)th bonded layer 30 is formed by applying a predetermined amount of the bonding liquid 10 to the (n−1)th powder layer. At the same time, a part of a non-bonded region of the (n−1)th layer, above which the overhang portion 30b of the (n)th bonded layer 30 is to be formed, is also applied with the bonding liquid 10 so that the frame pattern 35 is formed therein. The frame pattern 35 is formed with a smaller amount of the bonding liquid 10 than the bonded layer 30 is formed.

Next, as illustrated in FIG. 16B, the (n)th bonded layer 30 is formed. The overhang portion 30b, below which the frame pattern 35 has been formed, is formed with a larger amount of the bonding liquid 10 than the non-overhang portion 30a is formed.

Next, as illustrated in FIG. 16C, the (n+1)th and above bonded layers 30 are formed.

Figure 17A:
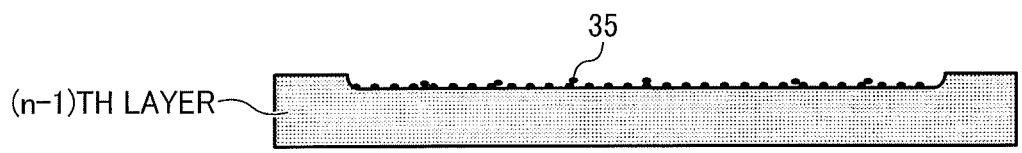
FIGS. 17A and 17B are cross-sectional illustrations for explaining the mechanism of permeation according to the third embodiment of the present invention.
Figure 17B:
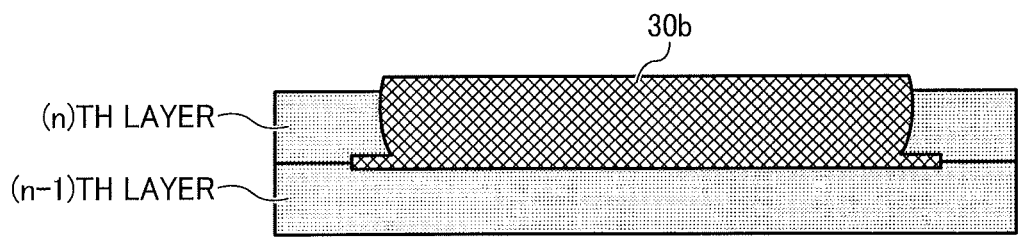
Figure 18A:
FIGS. 18A and 18B are cross-sectional illustrations for explaining the mechanism of permeation according to a comparative example.
Figure 18B:
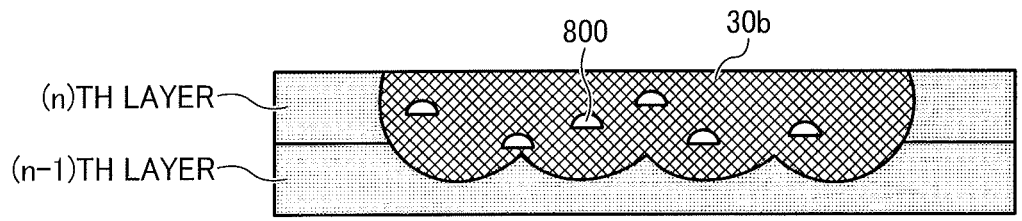

A mechanism of permeation of the bonding liquid according to the present embodiment is described below with reference to FIGS. 17A and 17B. FIGS. 17A and 17B are cross-sectional illustrations for explaining the mechanism of permeation. FIGS. 18A and 18B are cross-sectional illustrations for explaining a comparative example.

In the comparative example, as illustrated in FIG. 18A, no frame pattern has been formed in a non-bonded region in the (n−1) layer above which the overhang portion 30b of the (n)th layer is to be formed.

When the bonding liquid 10 is applied to the new bonding region of the (n)th powder layer corresponding to the overhang portion 30b of the (n)th bonded layer 30 with no frame pattern existing in the (n−1)th layer, as illustrated in FIG. 18B, the powder 20 may aggregate to a great extent upon application of the bonding liquid 10. Thus, the bonding liquid 10 may permeate the (n)th layer in Z direction (the direction of lamination) to reach the (n−1)th layer, since nothing inhibits permeation of the bonding liquid 10.

As a result, the surface of the overhang portion 30b of the (n)th bonded layer 30 will become less flattened. Moreover, voids 800 will be generated inside the overhang portion 30b while reducing density of the overhang portion 30b.

By contrast, in the present embodiment, as illustrated in FIG. 17A, the frame pattern 35 has been formed in a non-bonded region in the (n−1)th layer above which the overhang portion 30b of the (n)th layer is to be formed, to cause the powder 20 to aggregate and solidify into the shape of the frame pattern 35.

When the bonding liquid 10 is applied to the new bonding region corresponding to the overhang portion 30b of the (n)th bonded layer 30 with the frame pattern 35 existing in the (n−1)th layer, as illustrated in FIG. 17B, the frame pattern 35 suppresses the powder 20 in the (n)th layer from migrating and the bonding liquid 10 from permeating the (n−1)th layer.

As a result, the surface of the overhang portion 30b of the (n)th bonded layer 30 is kept flattened.

The amount of the bonding liquid 10 applied for forming the overhang portion 30b of the (n)th layer is set greater than that applied for forming the non-overhang portion 30a other than the overhang portion 30b, so that the bonding liquid 10 slightly remains on the powder surface of the (n)th layer.

Thus, a wet portion is promptly formed on the powder surface. In the (n+1)th layer and above layers, the powder 20 is supplied to the wet portion so that the bonding liquid 10 can permeate voids in the powder 20 layer not only from above but also from below, thus securing a certain degree of density.

Figure 19:
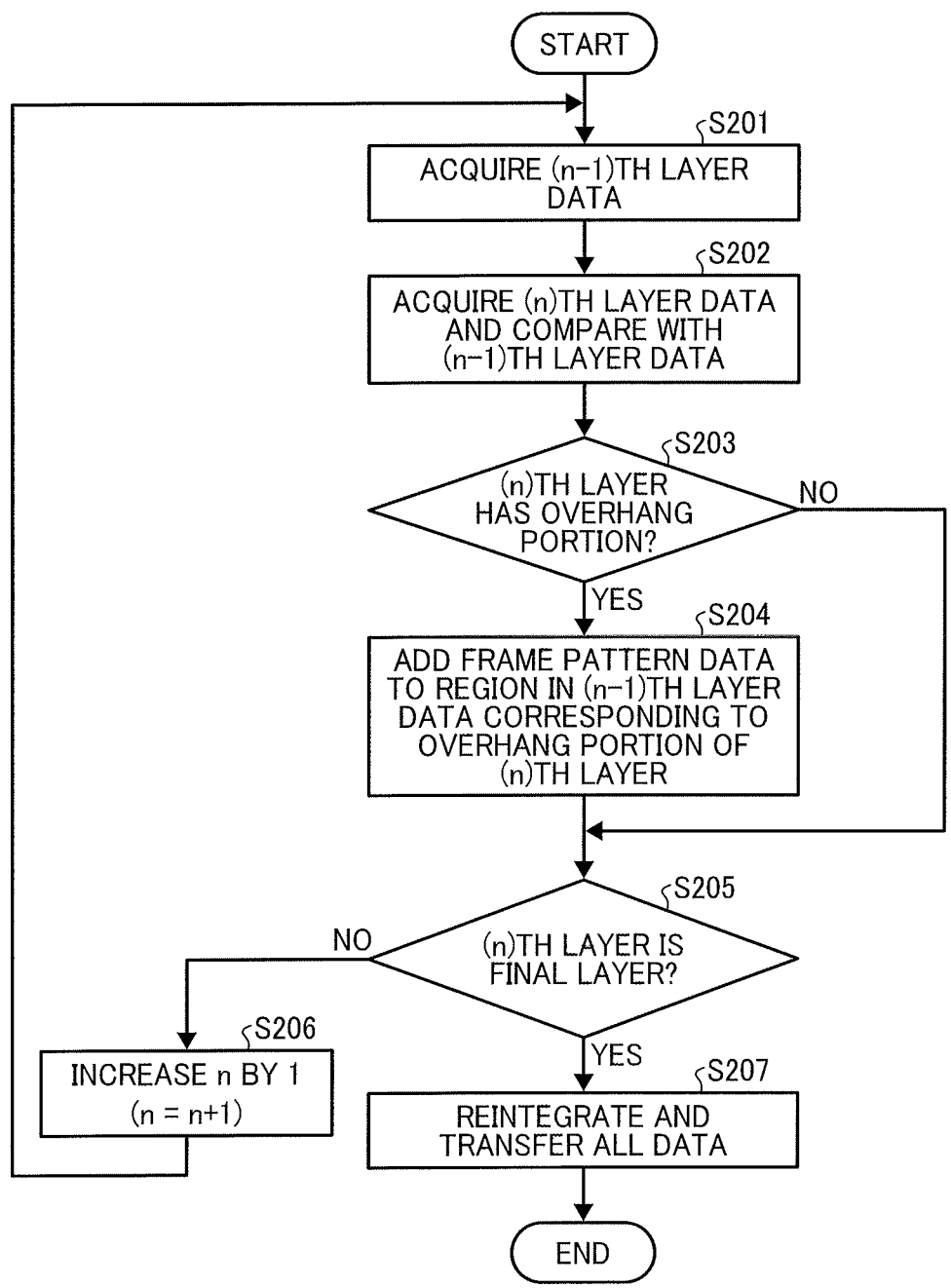
FIG. 19 is a flowchart of a modeling data generating operation according to the third embodiment of the present invention.

FIG. 19 is a flowchart of a modeling data generating operation according to the present embodiment.

The modeling data generating process is performed by the modeling data generating device 600.

In S201, slice data for the (n−1)th layer is acquired. In S202, slice data for the (n)th layer is acquired and compared with that for the (n−1)th layer. In S203, whether the (n)th layer has an overhang portion 30b or not is determined.

When the (n)th layer has an overhang portion 30b, in S204, data for the frame pattern 35 is added to a region of modeling data for the (n−1)th layer which corresponds to the overhang portion 30b of the (n)th layer.

When the (n)th layer has no overhang portion 30b, modeling data for the (n−1)th layer remains unchanged.

In S205, whether the (n)th layer is the final layer or not is determined. When the (n)th layer is determined not to be the final layer, in S206, n is increased by 1, and the above-described processes are repeated. When the (n)th layer is determined to be the final layer, in S207, all the slice data are reintegrated and transferred to the additive manufacturing device 601.

Figure 20:
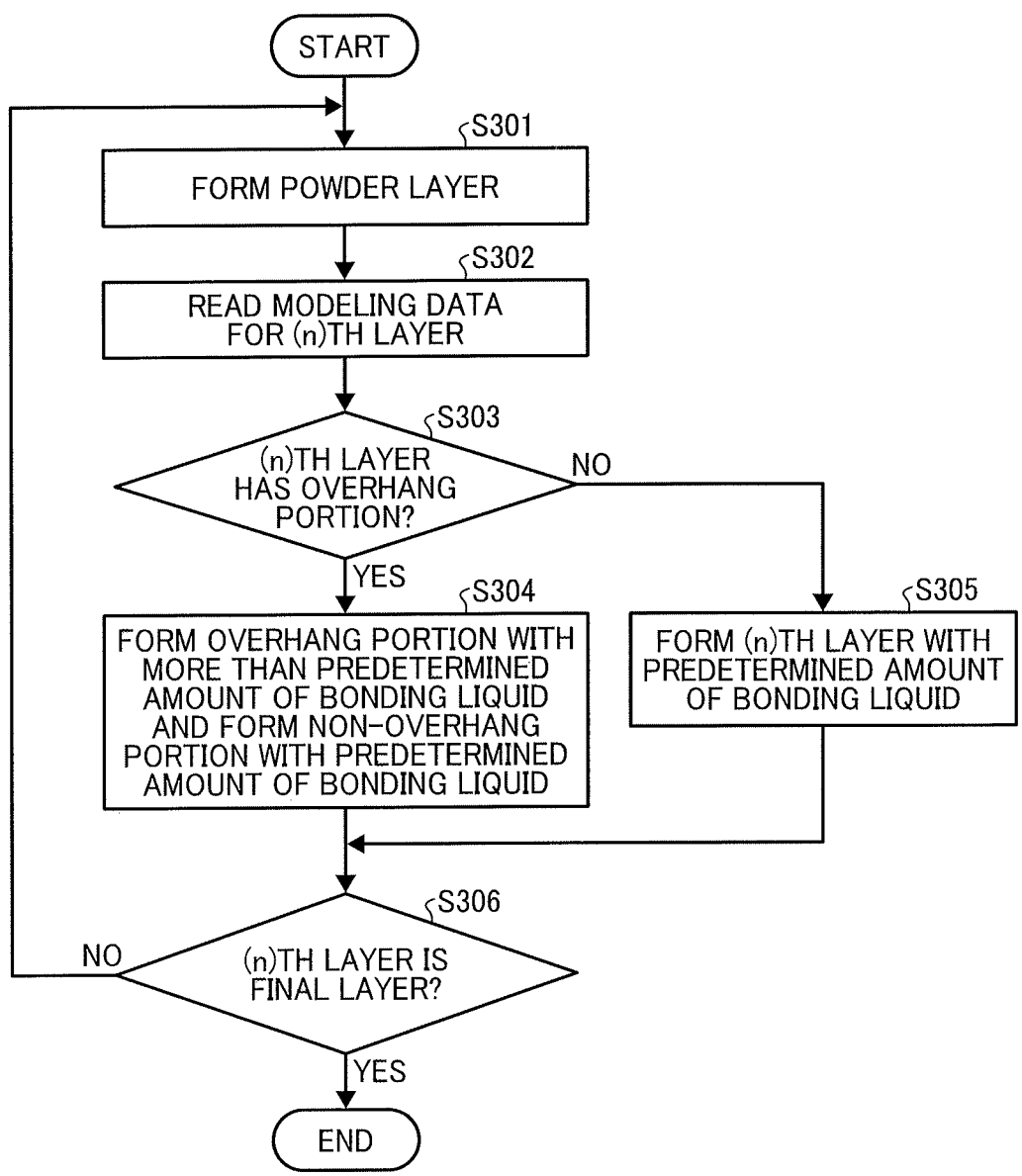
FIG. 20 is a flowchart of a three-dimensional object shaping operation according to the third embodiment of the present invention.

FIG. 20 is a flowchart of a three-dimensional object shaping operation according to the present embodiment.

In S301, a powder layer 31 is formed. In S302, modeling data for the (n)th bonded layer 30 is read. In S303, whether the (n)th layer has an overhang portion 30b or not is determined.

When the (n)th layer has an overhang portion 30b, in S304, the non-overhang portion 30a (other than the overhang portion 30b) is formed with a predetermined amount of the bonding liquid 10, and the overhang portion 30b is formed with more than the predetermined amount of the bonding liquid 10, thus forming the (n)th bonded layer 30.

When the (n)th layer has no overhang portion 30b, in S305, a predetermined amount of the bonding liquid 10 is applied, thus forming the (n)th bonded layer 30.

In S306, whether the (n)th layer is the final layer or not is determined. The above-described operations for forming a bonded layer 30 are repeated until the (n)th layer is determined to be the final layer. The shaping operation ends when all the bonded layers have been formed.

It is to be noted that, when the (n)th layer has an overhang portion 30b, modeling data for the frame pattern 35 has been added to that for the (n−1)th layer, and the frame pattern 35 has been formed with a predetermined amount of the bonding liquid 10, although such a process has been omitted from the flowchart for the sake of simplicity.

Figure 21A:
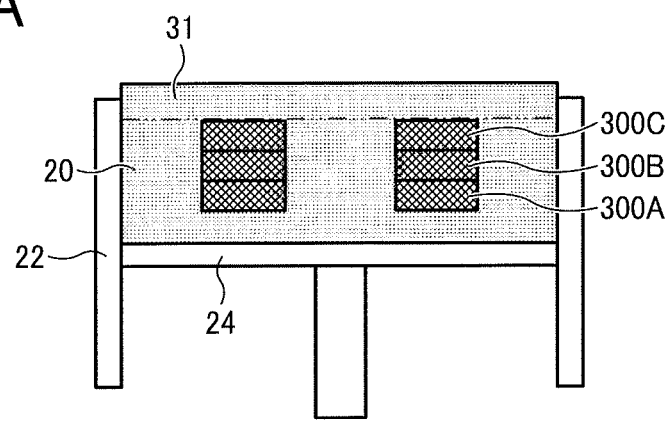
FIGS. 21A to 21C are illustrations of a three-dimensional object shaping operation according to a fourth embodiment of the present invention.
Figure 21B:
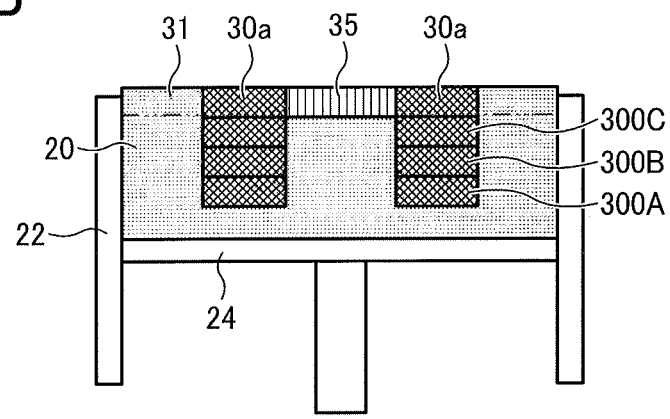
Figure 21C:
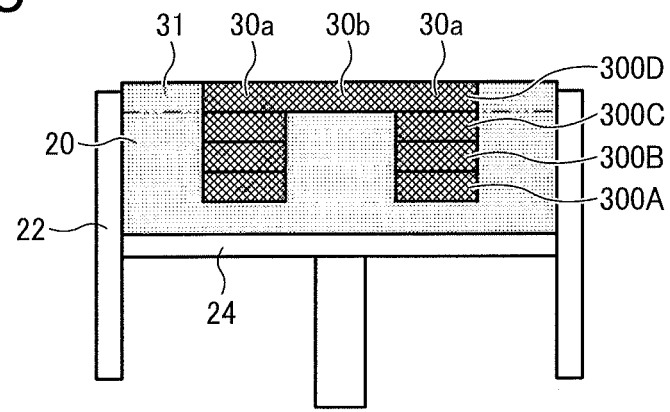

A fourth embodiment of the present invention is described below with reference to FIGS. 21A to 21C. FIGS. 21A to 21C are illustrations of a three-dimensional object shaping operation according to the fourth embodiment.

In the present embodiment, when the (n)th bonded layer 30 has an overhang portion 30b, during the forward movement of the head 52, the frame pattern 35 is formed in the new bonding region 30B corresponding to the overhang portion 30b, and the non-overhang portion 30a is formed by applying a predetermined amount of the bonding liquid 10 to the existing bonding region 30A.

Next, during the backward movement of the head 52, more than the predetermined amount of the bonding liquid 10 is applied only to the new bonding region 30B in which the frame pattern 35 has been formed to form the overhang portion 30b, thus forming the (n)th bonded layer 30.

In a case in which the three-dimensional object 300 illustrated in FIG. 7 is to be formed according to the present embodiment, first, the first bonded layer 300A, the second bonded layer 300B, and the third bonded layer 300C are formed in series, as illustrated in FIG. 21A, and a powder layer 31, to become the fourth ((n)th) bonded layer 300D, is formed thereafter.

The fourth ((n)th) bonded layer 300D has an overhang portion 30b below which the third ((n−1)th) bonded layer 300C does not exist.

Thus, as illustrated in FIG. 21B, during the forward movement of head 52, the frame pattern 35 is formed M a region corresponding to the overhang portion 30b, and the non-overhang portion 30a of the bonded layer 300D is formed by applying a predetermined amount of the bonding liquid to the other region.

Next, during the backward movement of the head 52, as illustrated in FIG. 21C, equal to or more than the predetermined amount of the bonding liquid 10 is applied to the region in which the frame pattern 35 has been formed to form the overhang portion 30b, thus forming the bonded layer 300D.

Figure 22A:
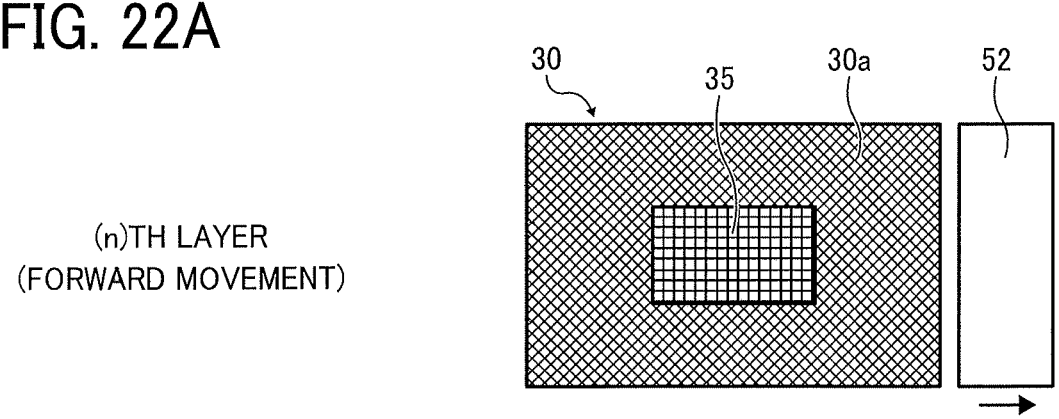
FIGS. 22A to 22C are plan views for explaining an operation for forming the (n)th layer according to the fourth embodiment of the present invention.
Figure 22B:
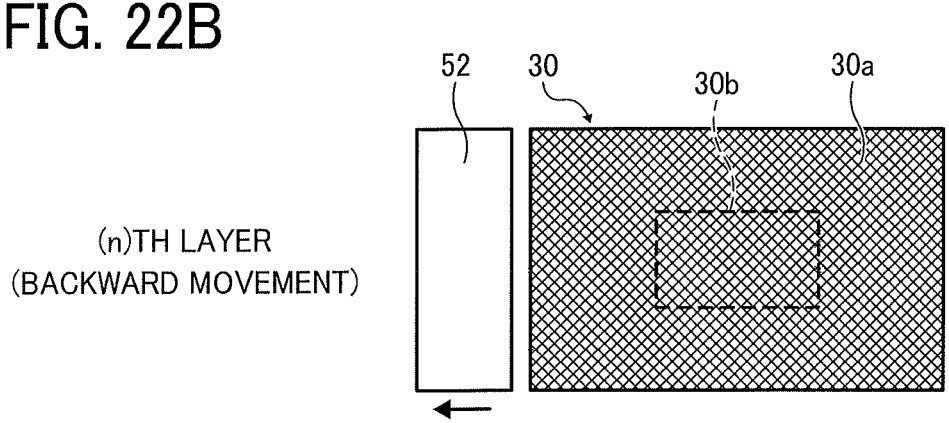
Figure 22C:
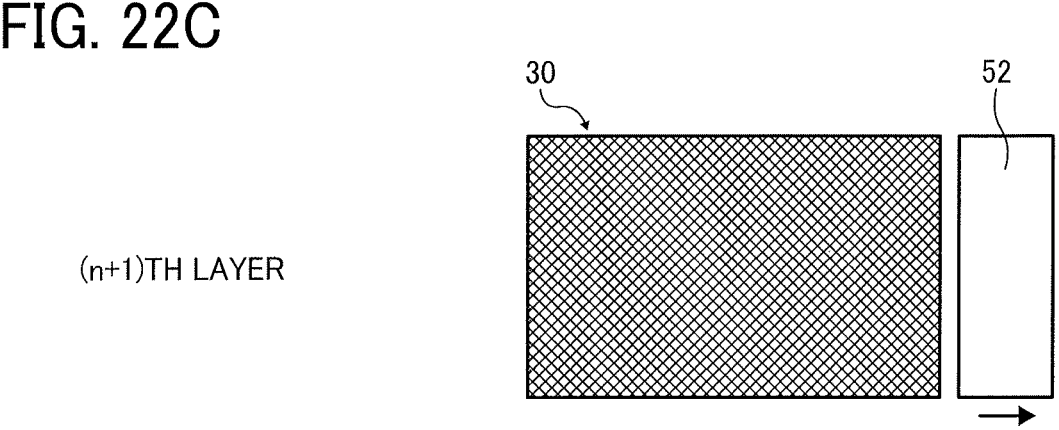

An operation for forming the (n)th layer is described with reference to FIGS. 22A to 22C. FIGS. 22A to 22C are plan views for explaining the operation for forming the (n)th layer.

When forming the (n)th bonded layer 30, as illustrated in FIG. 22A, during the forward movement of the head 52, the frame pattern 35 is formed in a region corresponding to the overhang portion 30b of the bonded layer 30, and the non-overhang portion 30a is formed by applying a predetermined amount of the bonding liquid 10 to the existing bonding region.

Next, during the backward movement of the head 52, as illustrated in FIG. 22B, equal to or more than the predetermined amount of the bonding liquid 10 is applied to the region corresponding to the overhang portion 30b of the bonded layer 30 to form the overhang portion 30b, thus forming the (n)th bonded layer 30.

Next, as illustrated in FIG. 22C, the (n+1)th bonded layer 30 is formed.

Figure 23A:
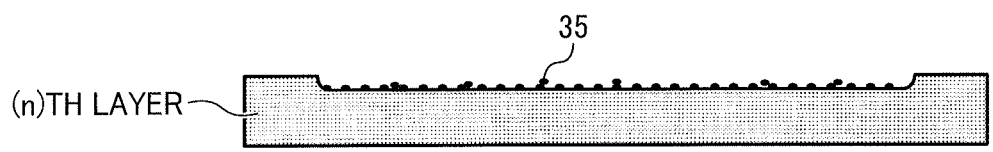
FIGS. 23A and 23B are cross-sectional illustrations for explaining the mechanism of permeation according to the fourth embodiment of the present invention.
Figure 23B:
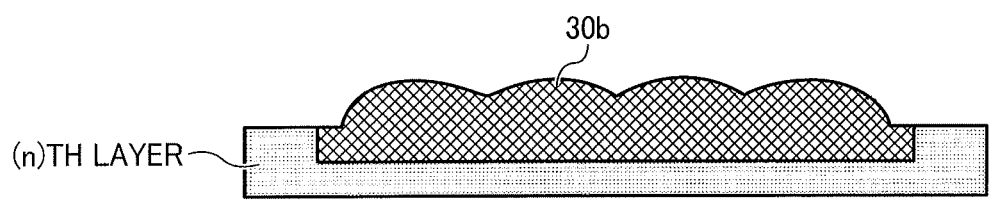

A mechanism of permeation of the bonding liquid according to the present embodiment is described below with reference to FIGS. 23A and 23B. FIGS. 23A and 23B are cross-sectional illustrations for explaining the mechanism of permeation.

In the present embodiment, as illustrated in FIG. 23A, when forming the (n)th bonded layer 30, the frame pattern 35 is formed in a region corresponding to the overhang portion 30b during the forward movement of the head 52, to cause the powder 20 to aggregate and solidify into the shape of the frame pattern 35.

As equal to or more than the predetermined amount of the bonding liquid 10 is applied to the frame pattern 35 during the backward movement of the head 52, as illustrated in FIG. 23B, the frame pattern 35 suppresses the powder 20 in the (n)th layer from migrating. In addition, the frame pattern 35 also suppresses the bonding liquid 10 from permeating the (n)th layer.

As a result, the surface of the overhang portion 30b of the (n)th bonded layer 30 is kept flattened.

The amount of the bonding liquid 10 applied for forming the overhang portion 30b of the (n)th layer is set greater than that applied for forming the non-overhang portion 30a (other than the overhang portion 30b), so that the bonding liquid 10 slightly remains on the powder surface of the (n)th layer.

Thus, a wet portion is promptly formed on the powder surface. In the (n+1)th layer and above layers, the powder 20 is supplied to the wet portion so that the bonding liquid 10 can permeate voids in the powder 20 layer not only from above but also from below, thus securing a certain degree of density.

Figure 24:
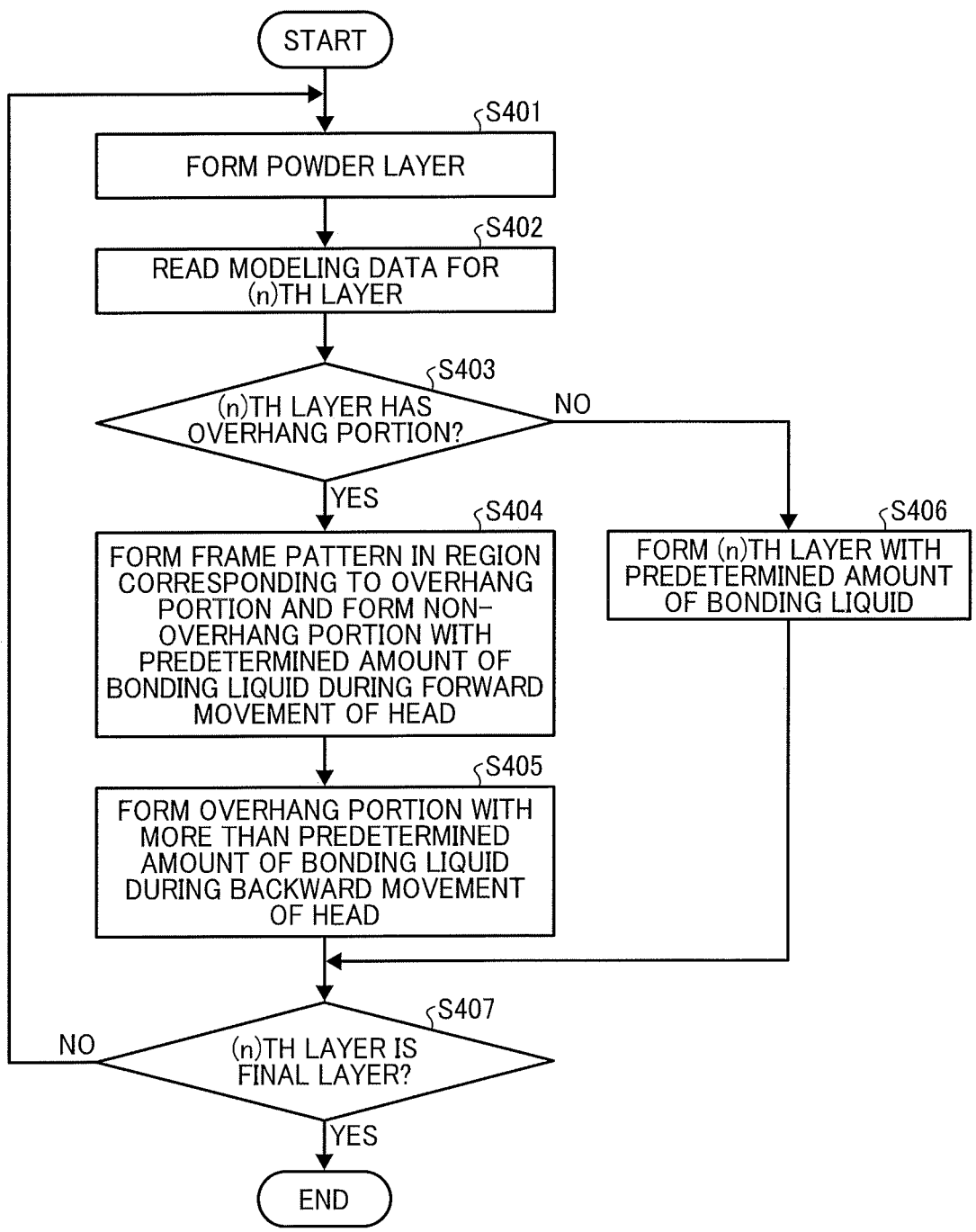
FIG. 24 is a flowchart of a three-dimensional object shaping operation according to the fourth embodiment of the present invention.

FIG. 24 is a flowchart of a three-dimensional object shaping operation according to the present embodiment.

In S401, a powder layer 31 is formed. In S402, modeling data for the (n)th bonded layer 30 is read. In S403, whether the (n)th layer has an overhang portion 30b or not is determined.

When the (n)th bonded layer 30 has an overhang portion 30b, in S404, during the forward movement of the head 52, the frame pattern 35 is formed in a region corresponding to the overhang portion 30b and the non-overhang portion 30a is formed by applying a predetermined amount of the bonding liquid 10 to the other region (existing bonding region).

Next, during the backward movement of the head 52, in S405, the bonding liquid 10 is applied to the frame pattern 35 to form the overhang portion 30b, thus forming the (n)th bonded layer 30.

When the (n)th bonded layer 30 has no overhang portion 30b, in S406, a predetermined amount of the bonding liquid 10 is applied during the forward movement of the head 52, thus forming the (n)th bonded layer 30.

In S407, whether the (n)th layer is the final layer or not is determined. The shaping operation ends when all the bonded layers have been formed.

Figure 25A:
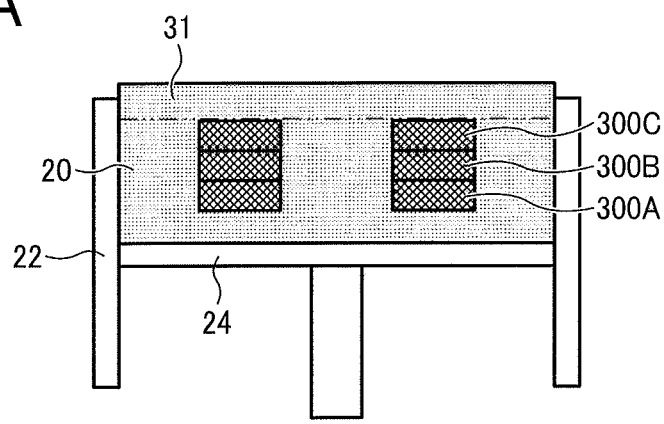
FIGS. 25A to 25C are illustrations of a three-dimensional object shaping operation according to a fifth embodiment of the present invention.
Figure 25B:
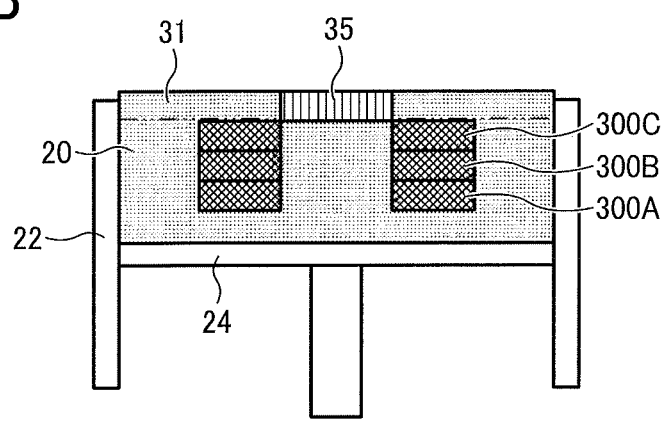
Figure 25C:
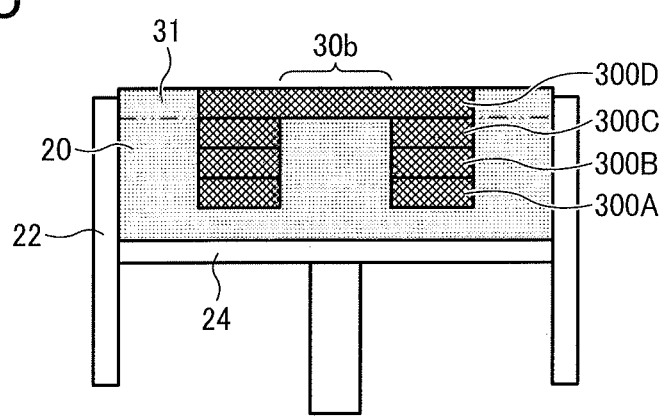

A fifth embodiment of the present invention is described below with reference to FIGS. 25A to 25C. FIGS. 25A to 25C are illustrations of a three-dimensional object shaping operation according to the fifth embodiment.

In the present embodiment, when the (n)th bonded layer 30 has an overhang portion 30b, during the forward movement of the head 52, the frame pattern 35 is formed in the new bonding region 30B corresponding to the overhang portion 30b (to be described later referring to FIG. 26B).

Next, during the backward movement of the head 52, the bonding liquid 10 is applied to all the region including the frame pattern 35, thus forming the (n)th bonded layer 30.

In a case in which the three-dimensional object 300 illustrated in FIG. 7 is to be formed according to the present embodiment, first, the first bonded layer 300A, the second bonded layer 300B, and the third bonded layer 300C are formed in series, as illustrated in FIG. 25A, and a powder layer 31, to become the fourth ((n)th) bonded layer 300D, is formed thereafter.

The fourth ((n)th) bonded layer 300D has an overhang portion 30b below which the third ((n−1)th) bonded layer 300C does not exist.

Thus, as illustrated in FIG. 25B, during the forward movement of the head 52, the frame pattern 35 is formed in a region corresponding to the overhang portion 30b. However, the other region (existing bonding region) is not applied with the bonding liquid 10.

Next, during the backward movement of the head 52, as illustrated in FIG. 25C, equal to or more than the predetermined amount of the bonding liquid 10 is applied to the all region including the frame pattern 35, thus forming the bonded layer 300D.

Figure 26A:
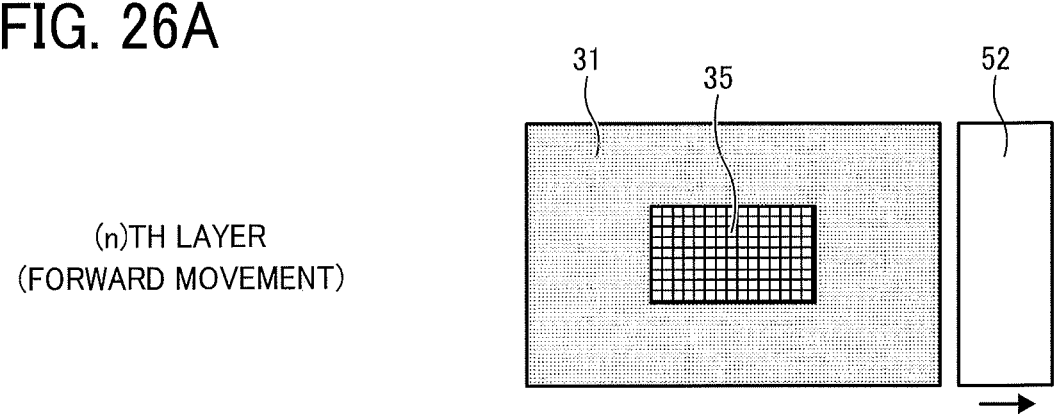
FIGS. 26A to 26C are plan views for explaining an operation for forming the (n)th layer according to the fifth embodiment of the present invention.

An operation for Ruining the (n)th layer is described with reference to FIGS. 26A to 26C. FIGS. 26A to 26C are plan views for explaining the operation for forming the (n)th layer.

When forming the (n)th bonded layer 30, as illustrated in FIG. 26A, during the forward movement of the head 52, the frame pattern 35 is formed in a region corresponding to the overhang portion 30b of the bonded layer 30, and the other region (existing bonding region) is not applied with the bonding liquid 10.

Figure 26B:
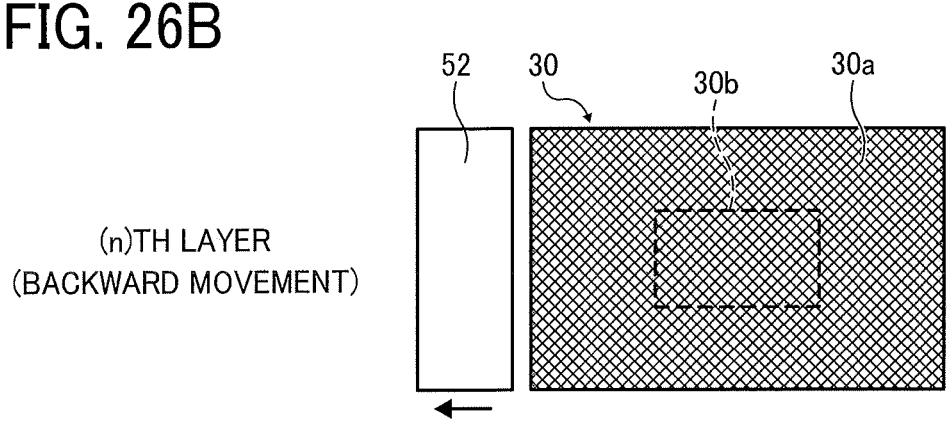
Figure 26C:
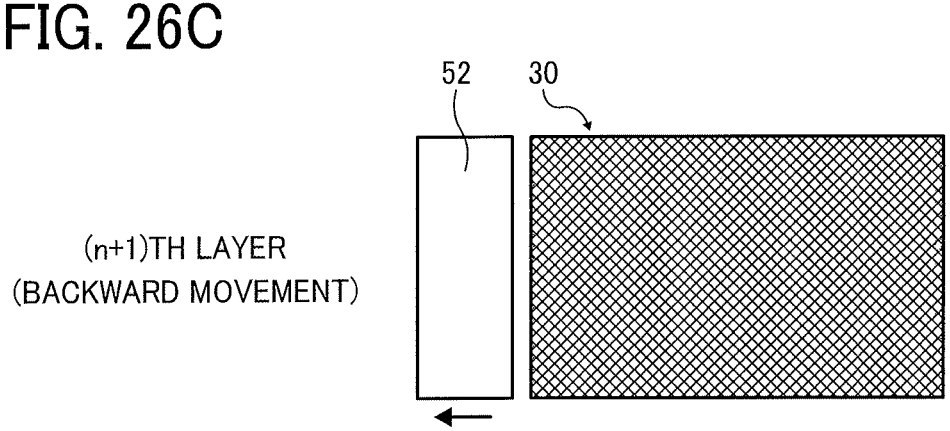

Next, during the backward movement of the head 52, as illustrated in FIG. 26B, a predetermined amount of the bonding liquid 10 is applied to all the region to become the bonded layer 30, thus forming the (n)th bonded layer 30.

Next, as illustrated in FIG. 26, the (n+1)th bonded layer 30 is formed.

Figure 27:
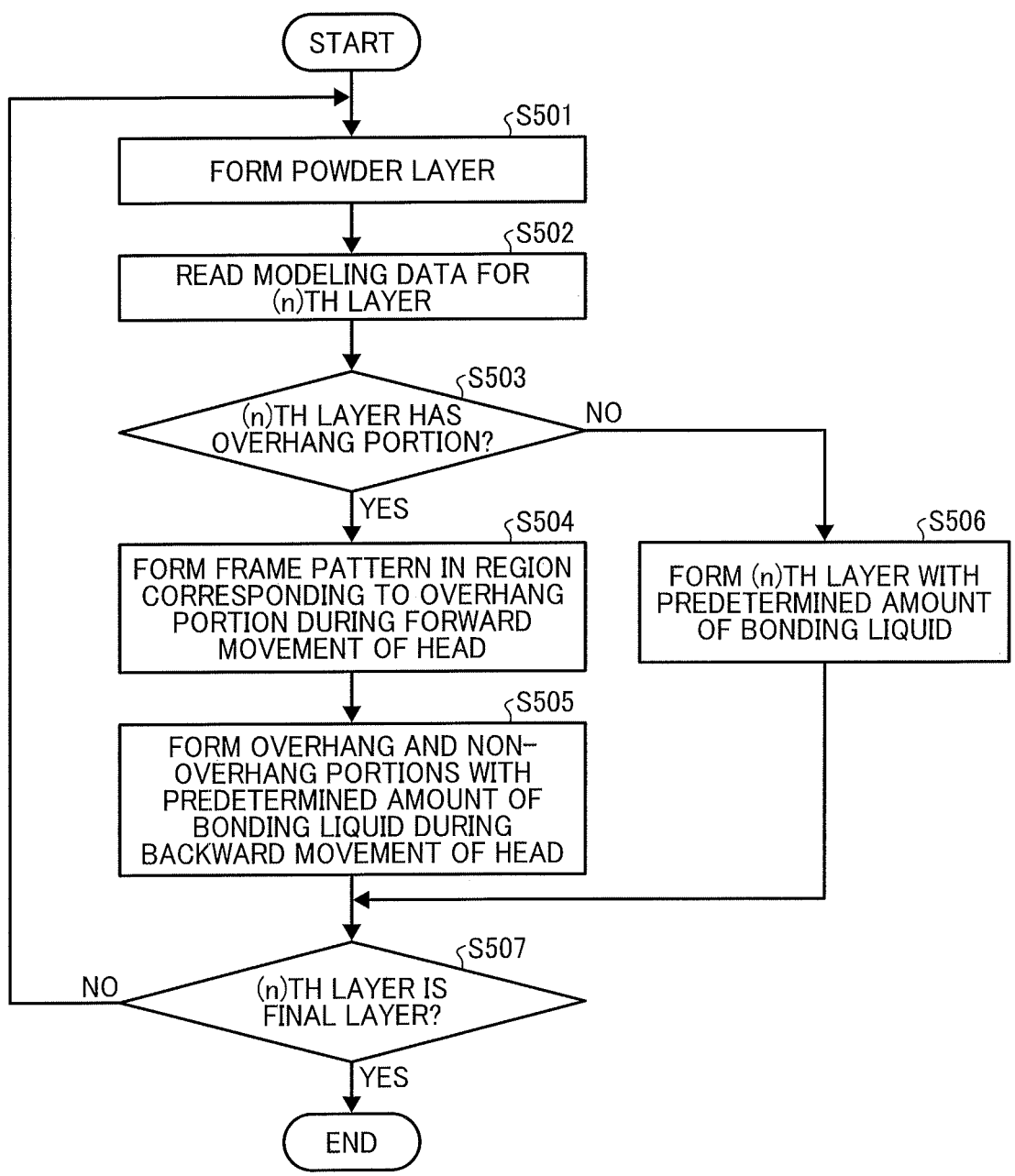
FIG. 27 is a flowchart of a three-dimensional object shaping operation according to the fifth embodiment of the present invention.

FIG. 27 is a flowchart of a three-dimensional object shaping operation according to the present embodiment.

In S501, a powder layer 31 is formed. In S502, modeling data for the (n)th bonded layer 30 is read. In S503, whether the (n)th layer has an overhang portion 30b or not is determined.

When the (n)th bonded layer 30 has an overhang portion 30b, in S504, during the forward movement of the head 52, the frame pattern 35 is formed in a region corresponding to the overhang portion 30b, and the other region corresponding to the non-overhang portion 30a is not applied with the bonding liquid 10.

Next, during the backward movement of the head 52, in S505, the bonding liquid 10 is applied to all the region including the frame pattern 35, thus forming the (n)th bonded layer 30.

When the (n)th bonded layer 30 has no overhang portion 30b, in S506, a predetermined amount of the bonding liquid 10 is applied during the forward movement of the head 52, thus forming the (n)th bonded layer 30.

In S507, whether the (n)th layer is the final layer or not is determined. The shaping operation ends when all the bonded layers have been formed.

In the fourth and fifth embodiments, the modeling data generating device 600 may compare slice data for the continuous (n−1)th and (n)th layers, where n represents an integer of 1 or above, and create modeling data for the (n)th layer along with modeling data for a frame pattern to be formed in a new bonding region of the (n)th layer, based on the comparison result.

In this case, the additive manufacturing device 601 performs a shaping operation based on the modeling data for the (n)th layer along with the modeling data for a frame pattern in the (n)th layer, during forward and backward movements of the head 52.

In the above-described embodiments, the apparatus for producing three-dimensional objects has two tanks, i.e., the supply tank and the shaping tank. Alternatively, according to another embodiment, the apparatus may include only the shaping tank. In this case, a powder is directly supplied to the shaping tank and flattened by a flattening member such as a blade and a roller.

In accordance with an embodiment of the present invention, an apparatus for producing three-dimensional objects is provided. The apparatus includes: a bonding liquid applier configured to apply a bonding liquid to a powder layer, so that the bonding liquid bonds powder particles in the powder layer into a bonded layer; and a controller to control the bonding liquid applier to form an (n)th bonded layer by: applying a predetermined amount of the bonding liquid per unit area, in multiple times, to a new bonding region in an (n)th powder layer, below which an (n−1)th bonded layer does not exist, and applying the predetermined amount of the bonding liquid per unit area, in a smaller number of times than the multiple times, to an existing bonding region in the (n)th powder layer, below which the (n−1)th bonded layer exists, while increasing a numeral (n) representing an integer of 1 and above in increment of 1, to laminate multiple bonded layers into a three-dimensional object.

In the above apparatus, the existing bonding region may be applied with the bonding liquid at the time when the new bonding region is applied with the bonding liquid for the last time. In addition, the number of times of application of the bonding liquid to the new bonding region may be variable depending on an area of the new bonding region.

The present embodiment further provides a method for producing three-dimensional objects. The method includes the steps of forming an (n)th bonded layer and increasing a numeral (n) representing an integer of 1 and above in increment of 1, to laminate multiple bonded layers into a three-dimensional object. The forming step further includes the steps of: applying a predetermined amount of a bonding liquid per unit area, in multiple times, to a new bonding region in an (n)th powder layer, below which an (n−1)th bonded layer does not exist, so that the bonding liquid bonds powder particles in the new bonding region; and applying the predetermined amount of the bonding liquid per unit area, in a smaller number of times than the multiple times, to an existing bonding region in the (n)th powder layer, below which the (n−1)th bonded layer exists, so that the bonding liquid bonds powder particles in the existing bonding region.

The present embodiment further provides a non-transitory recording medium storing a plurality of instructions which, when executed by one or more processors, cause the processors to perform the above method.

In accordance with another embodiment of the present invention, an apparatus for producing three-dimensional objects is provided. The apparatus includes: a bonding liquid applier configured to apply a bonding liquid to a powder layer, so that the bonding liquid bonds powder particles in the powder layer into a bonded layer; and a controller to control the bonding liquid applier to form a frame pattern in a non-bonded region in an (n−1)th powder layer, above which a new bonding region in an (n)th powder layer to exist, by applying less than a predetermined amount of the bonding liquid per unit area to the non-bonded region, while increasing a numeral (n) representing an integer of 1 and above in increment of 1, to laminate multiple bonded layers into a three-dimensional object.

Here, the frame pattern may be one of a net-like pattern, a line-like pattern, or a grid-like pattern. In addition, the bonding liquid applier may form an (n)th bonded layer by applying the bonding liquid to the new bonding region in the (n)th powder layer in an amount per unit area greater than that applied to the other region in the (n)th powder layer.

The present embodiment further provides a method for producing three-dimensional objects. The method includes the steps of: forming a frame pattern in a non-bonded region in an (n−1)th powder layer, above which a new bonding region in an (n)th powder layer to exist, by applying less than a predetermined amount of the bonding liquid per unit area to the non-bonded region; and increasing a numeral (n) representing an integer of 1 and above in increment of 1, to laminate multiple bonded layers into a three-dimensional object.

The present embodiment further provides a non-transitory recording medium storing a plurality of instructions which, when executed by one or more processors, cause the processors to perform the above method.

The present embodiment further provides a device for generating modeling data for three-dimensional objects. The device generates modeling data for an (n)th bonded layer by: comparing slice data for the (n)th bonded layer and that for an (n+1)th bonded layer, and adding data, based on the comparison result, for forming a frame pattern in a non-bonded region in an (n)th powder layer, above which a new bonding region in an (n+1)th powder layer to exist, by applying less than a predetermined amount of the bonding liquid per unit area to the non-bonded region, while increasing a numeral (n) representing an integer of 1 and above in increment of 1, to laminate multiple bonded layers into a three-dimensional object.

In accordance with another embodiment of the present invention, an apparatus for producing three-dimensional objects is provided. The apparatus includes: a bonding liquid applier configured to apply a bonding liquid to a powder layer, so that the bonding liquid bonds powder particles in the powder layer into a bonded layer; and a controller to control the bonding liquid applier to form a frame pattern in a new bonding region in an (n)th powder layer, below which an (n−1)th bonded layer does not exist, by applying less than a predetermined amount of the bonding liquid per unit area, and thereafter form an (n)th bonded layer by applying the predetermined amount of the bonding liquid per unit area to the new bonding region in which the frame pattern has been formed, while increasing a numeral (n) representing an integer of 1 and above in increment of 1, to laminate multiple bonded layers into a three-dimensional object.

Here, the frame pattern may be one of a net-like pattern, a line-like pattern, or a grid-like pattern. In the above apparatus, the bonding liquid applier may be horizontally movable either forward or backward relative to the powder layer. In this case, the frame pattern may be formed in the new bonding region while the bonding liquid applier is moving forward, and the (n)th bonded layer may be formed while the bonding liquid applier is moving backward. Alternatively, the frame pattern and a non-overhang portion of the (n)th bonded layer, corresponding to an existing bonding region other than the new bonding region in the (n)th powder layer may be formed while the bonding liquid applier is moving forward, and an overhang portion of the (n)th bonded layer, corresponding to the new bonding region in the (n)th powder layer may be formed while the boding liquid applier is moving backward. In the latter case, the amount of the bonding liquid applied to the new bonding region while the bonding liquid applier is moving backward is greater than that applied to the existing bonding region while the bonding liquid applier is moving forward.

The present embodiment further provides a method for producing three-dimensional objects. The method includes the steps of: forming a frame pattern in a new bonding region in an (n)th powder layer, below which an (n−1)th bonded layer does not exist, by applying less than a predetermined amount of the bonding liquid per unit area; forming an (n)th bonded layer by applying the predetermined amount of the bonding liquid per unit area to the new bonding region in which the frame pattern has been formed; and increasing a numeral (n) representing an integer of 1 and above in increment of 1, to laminate multiple bonded layers into a three-dimensional object.

The present embodiment further provides a non-transitory recording medium storing a plurality of instructions which, when executed by one or more processors, cause the processors to perform the above method.

In accordance with another embodiment of the present invention, a device for generating modeling data for three-dimensional objects is provided. The device forms modeling data for an (n)th bonded layer by: comparing slice data for the (n)th bonded layer and that for an (n+1)th bonded layer; and generating modeling data for the (n)th bonded layer along with modeling data for a frame pattern in a new bonding region in an (n)th powder layer based on the comparison result, while increasing a numeral (n) representing an integer of 1 and above in increment of 1, to laminate multiple bonded layers into a three-dimensional object.

In accordance with another embodiment of the present invention, an apparatus for producing three-dimensional objects is provided. The apparatus includes: a bonding liquid applier configured to apply a bonding liquid to a powder layer, so that the bonding liquid bonds powder particles in the powder layer into a bonded layer; and a controller to control the bonding liquid applier to form an (n)th bonded layer, when an (n)th powder layer includes both a new bonding region, below which an (n−1)th bonded layer does not exist, and an existing bonding region, below which the (n−1)th bonded layer exist, by applying the bonding liquid to the (n−1)th powder layer in an amount per unit area greater than that applied thereto when the (n)th powder layer includes no new bonding region.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An apparatus for producing three-dimensional objects, comprising:
   a bonding liquid applier configured to apply a bonding liquid to a powder layer, so that the bonding liquid bonds powder particles in the powder layer into a bonded layer; and
   a controller to control the bonding liquid applier to repeatedly form an (n)th bonded layer by:
      applying a predetermined total amount of the bonding liquid per unit area, the predetermined total amount being applied via multiple passes of the bonding liquid applier to a new bonding region in an (n)th powder layer defined as a region below which an (n−1)th bonded layer does not exist, and
      applying the predetermined total amount of the bonding liquid per unit area, the predetermined total amount being applied via a smaller number of passes of the bonding liquid applier than the multiple passes, to an existing bonding region in the (n)th powder layer defined as a region below which the (n−1)th bonded layer exists,
   wherein n is an integer equal to one or more, and the controller is further configured to increment n by one and repeat the applying steps so as to laminate multiple bonded layers into a three-dimensional object.

2. The apparatus of claim 1, wherein the controller is further configured to control the bonding liquid applier such that the existing bonding region is applied with the bonding liquid during a last pass of the multiple passes of the bonding liquid applier, and the new bonding region is also applied with the bonding liquid during the last pass.

3. The apparatus of claim 1, wherein a number of the multiple passes of application of the bonding liquid to the new bonding region is variable depending on an area of the new bonding region.

4. The apparatus of claim 2, wherein a number of the multiple passes of application of the bonding liquid to the new bonding region is variable depending on an area of the new bonding region.

5. The apparatus of claim 1, wherein the controller is further configured to cause the bonding liquid applier to apply the bonding liquid to different regions in differing amounts in a same pass of the bonding liquid applier.

6. A method for producing three-dimensional objects, comprising:
   forming an (n)th bonded layer, including:
      applying a total predetermined amount of a bonding liquid per unit area, the predetermined total amount being applied via multiple passes of the bonding liquid applier to a new bonding region in an (n)th powder layer defined as a region below which an (n−1)th bonded layer does not exist, so that the bonding liquid bonds powder particles in the new bonding region; and
      applying the total predetermined amount of the bonding liquid per unit area, the predetermined total amount being applied via a smaller number of passes of the bonding liquid applier than the multiple passes, to an existing bond region in the (n)th powder layer defined as a region below which the (n−1)th bonded layer exists, so that the bonding liquid bonds powder particles in the existing bonding region,
   wherein n is an integer equal to one or more, and the method further includes incrementing n by one and repeating the applying steps so as to laminate multiple bonded layers into a three-dimensional object.

7. The method of claim 6, Wherein the existing bonding region is applied with the bonding liquid during a last pass of the multiple passes of the bonding liquid applier, the new bonding region also being applied with the bonding liquid during the last pass.

8. The method of claim 6, wherein a number of the multiple passes of application of the bonding liquid to the new bonding region is variable depending on an area of the new bonding region.

9. The method of claim 7, wherein a number of the multiple passes of application of the bonding liquid to the new bonding region is variable depending on an area of the new bonding region.

10. A non-transitory recording medium storing a plurality of instructions which, when executed by processing circuitry, cause the processing circuitry to perform a method, comprising:
    forming an (n)th bonded layer, by:
       applying a predetermined total amount of a bonding liquid per unit area, the predetermined total amount being applied via multiple passes of the bonding liquid applier, to a new bonding region in an (n)th powder layer defined as a region below which an (n−1)th bonded layer does not exist, so that the bonding liquid bonds powder particles in the new bonding region; and
       applying the predetermined total amount of the bonding liquid per unit area, the predetermined total amount being applied via a smaller number of passes of the bonding liquid applier than the multiple passes, to an existing bonding region in the (n)th powder layer defined as a region below which the (n−1)th bonded layer exists, so that the bonding liquid bonds powder particles in the existing bonding region,
    wherein n is an integer equal to one or more, and the method further includes incrementing n by one and repeating the applying steps so as to laminate multiple bonded layers into a three-dimensional object.

11. The non-transitory recording medium of claim 10, wherein the existing bonding region is applied with the bonding liquid during a last pass of the multiple passes of the bonding liquid applier, the new bonding region also being applied with the bonding liquid during the last pass.

12. The non-transitory recording medium of claim 10, wherein a number of the multiple passes of application of the bonding liquid to the new bonding region is variable depending on an area of the new bonding region.

13. The non-transitory recording medium of claim 11, wherein a number of the multiple passes of application of the bonding liquid to the new bonding region is variable depending on an area of the new bonding region.

* * * * *